US005704017A

United States Patent [19]
Heckerman et al.

[11] Patent Number: 5,704,017
[45] Date of Patent: Dec. 30, 1997

[54] COLLABORATIVE FILTERING UTILIZING A BELIEF NETWORK

[75] Inventors: David E. Heckerman, Bellevue; John S. Breese, Mercer Island; Eric Horvitz, Kirkland, all of Wash.; David Maxwell Chickering, Los Angeles, Calif.

[73] Assignee: Microsoft Corporation, Redmond, Wash.

[21] Appl. No.: 602,238

[22] Filed: Feb. 16, 1996

[51] Int. Cl.$^6$ .................................................. G06F 17/00
[52] U.S. Cl. ............................ 395/61; 395/50; 395/51; 395/77
[58] Field of Search .................................. 395/62, 61, 77, 395/50, 51, 10, 11, 12, 13

[56] References Cited

U.S. PATENT DOCUMENTS 5,410,344   4/1995   Graves et al. ............................ 348/1
5,546,502   8/1996   Hart et al. ............................... 395/12

OTHER PUBLICATIONS

Goldberg et al., "Using Collaborative Filtering to Weave an Information Tapestery," *Communications of the ACM*, vol. 35, No. 12, 1992, pp. 61-70, Dec. 1992.

Resnick et al., "GroupLens: An Open Architecture for Collaborative Filtering of Netnews," in *Proceedings of ACM 1994 Conference on Computer Supported Cooperative Work*, Chapel Hill, NC, 1994, pp. 175-186.

Johnson and Wichern, *Applied Multivariate Statistical Analysis*, Prentice-Hall, New Jersey, 1982, Chap. 11, "Clustering," pp. 532-560.

Caruso, "Digital Commerce: In Sea of Web Data, Sudden Flash of Light," *The New York Times News Service*, Jan. 28, 1996.

Dempster et al., "Maximum Likelihood From Incomplete Data via the EM Algorithm," *J. R. Stat. Soc.*, vol. 39, No. 1, 1977, pp. 1-38.

KoJain, *Algorithms for Clustering Data*, Chap. 3, "Clustering Methods and Algorithms," 1988, pp. 55-142.

Jensen et al., "Bayesian Updating in Recursive Graphical Models by Local Computations," Technical Report R-89-15, *Institute of Electronic Systems*, Aalborg University, Denmark.

Cheeseman et al, "Bayesian Classification AutoClass: Theory and Results," *Advances in Knowledge Discovery and Data Mining*, AAAI Press (1995).

Heckerman, "A Tutorial on Learning Bayesian Networks," Technical Report MSR TR 95-06, Microsoft Research Advanced Technology Divison, Microsoft Corporation, pp. 1-40, Nov. 1995.

(List continued on next page.)

*Primary Examiner*—Tariq R. Hafiz
*Assistant Examiner*—Jason W. Rhodes
*Attorney, Agent, or Firm*—Seed and Berry LLP

[57] ABSTRACT

The disclosed system provides an improved collaborative filtering system by utilizing a belief network, which is sometimes known as a Bayesian network. The disclosed system learns a belief network using both prior knowledge obtained from an expert in a given field of decision making and a database containing empirical data obtained from many people. The empirical data contains attributes of users as well as their preferences in the field of decision making. After initially learning the belief network, the belief network is relearned at various intervals when additional attributes are identified as having a causal effect on the preferences and data for these additional attributes can be gathered. This relearning allows the belief network to improve its accuracy at predicting preferences of a user. Upon each iteration of relearning, a cluster model is automatically generated that best predicts the data in the database. After relearning the belief network a number of times, the belief network is used to predict the preferences of a user using probabilistic inference. In performing probabilistic inference, the known attributes of a user are received and the belief network is accessed to determine the probability of the unknown preferences of the user given the known attributes. Based on these probabilities, the preference most likely to be desired by the user can be predicted.

43 Claims, 13 Drawing Sheets

OTHER PUBLICATIONS

Bannan, Karen. "Watchdog applications protect children online." Computer Retail Week. vol. 5, No. 118. pp. 41–42, Nov. 6, 1995.

Durkin, John. Expert Systems Catalog of Applications. Intelligent Computer Systems, Inc. pp. 21, 59, 1993.

Cooper, Gregory F. and Hersovits, Edward. "A Bayesian Method for the Induction of Probabilistic Networks from Data." Machine Learning. vol. 9. Kluwer Academic Publishers. pp. 309–347, 1992.

Caruso, Denise. "Digital Commerce: In Sea of Web Data, Sudden Flash of Light." The New York Times News Service, Jan. 28, 1996.

Cheeseman, Peter et al. "Bayesian Classification." Advances in Knowledge Discovery and Data Mining. AAAI Press, 1995.

Breese, John and Heckerman, David. "Decision–Theoretic Case–Based Reasoning." Technical Report MSR–TR–95–03. Microsoft Research Advanced Technology Division., Nov. 1994.

Turksen, I.B. and Willson, Ian A. "An Experimental Methodology for a Fuzzy Set Preference Model." North American Fuzzy Information Processing Society (NAFIPS '92). vol. 1. pp. 276–285, 1992.

McCracken, Harry and Osborne, Jean. "The people's press: low–cost publishing software." InfoWorld. vol. 17 No. 3. pp. 68–78, Jan. 16, 1995.

Lasky, Michael S. et al. "Travel (one of seven evaluations of CD–ROMs in Best CDs of '94)." PC World. vol. 12. No. 12. p. 12, Dec. 1994.

Ballou, Melinda Carol. "Text retrieval system routes selected data to interested users." Digital Review. vol. 7. No. 18. pp. 9–10, May 7, 1990.

| | Age | Gender | Seinfeld | Matlock | Three Stooges | Sisters | Power Rangers |
|---|---|---|---|---|---|---|---|
| 502 | 13 | Female | Yes | No | No | Yes | Yes |
| 504 | 45 | Male | Yes | Yes | Yes | No | No |
| 506 | 55 | Female | Yes | Yes | No | Yes | No |
| ... | | | | | | | |

COLLABORATIVE FILTERING UTILIZING A BELIEF NETWORK

TECHNICAL FIELD

The present invention relates generally to data processing systems and, more particularly, to a collaborative filtering system that utilizes a belief network.

BACKGROUND OF THE INVENTION

Collaborative filtering systems have been developed that predict the preferences of a user. The term "collaborative filtering" refers to predicting the preferences of a user based on known attributes of the user, as well as known attributes of other users. For example, a preference of a user may be whether they would like to watch the television show "I Love Lucy" and the attributes of the user may include their age, gender, and income. In addition, the attributes may contain one or more of the user's known preferences, such as their dislike of another television show. A user's preference can be predicted based on the similarity of that user's attributes to other users. For example, if all users over the age of 50 with a known preference happen to like "I Love Lucy" and if that user is also over 50, then that user may be predicted to also like "I Love Lucy" with a high degree of confidence. One conventional collaborative filtering system has been developed that receives a database as input. The database contains attribute-value pairs for a number of users. An attribute is a variable or distinction, such as a user's age, gender or income, for predicting user preferences. A value is an instance of the variable. For example, the attribute age may have a value of 23. Each preference contains a numeric value indicating whether the user likes or dislikes the preference (e.g., 0 for dislike and 1 for like). The data in the database is obtained by collecting attributes of the users and their preferences.

It should be noted that conventional collaborative filtering systems can typically only utilize numerical attributes. As such, the values for non-numerical attributes, such as gender, are transposed into a numerical value, which sometimes reduces the accuracy of the system. For example, when a variable has three non-numerical states, such as vanilla, chocolate and strawberry, transposing these states into a numerical value will unintentionally indicate dissimilarity between the states. That is, if vanilla were assigned a value of 1, chocolate 2 and strawberry 3, the difference between each value indicates to the system how similar each state is to each other. Therefore, the system may make predictions based on chocolate being more similar to both vanilla and strawberry than vanilla is similar to strawberry. Such predictions may be based on a misinterpretation of the data and lead to a reduction in the accuracy of the system.

In performing collaborative filtering, the conventional system first computes the correlation of attributes between a given user "v" and each other user "u" (except v) in the database. The computation of the "correlation" is a well-known computation in the field of statistics. After computing the correlation, the conventional system computes, for example, the preference of a user "v" for a title of a television show "t" as follows:

$$\text{pref}(t,v) = \langle\text{pref}(t)\rangle + \frac{\sum_u (\text{pref}(t,u) - \langle\text{pref}(t)\rangle)\text{corr}(u,v)}{\sum_u \text{corr}(u,v)}$$

where "pref(t, v)" is the preference of user "v" for title "t," where "<pref(t)>" is the average preference of title "t" by all users, where "pref(t, u)" is the preference of user "u" for title "t," where "corr(u, v)" is the correlation of users "u" and "v," and the sums run over the users "u" that have expressed a preference for title "t." One drawback to this conventional system is that the entire database must be examined when predicting preferences, which requires a significant amount of processing time.

One way to improve upon this conventional system is to utilize a clustering algorithm. Using this approach, a collaborative filtering system uses any of a number of well-known clustering algorithms to divide the database into a number of clusters. For example, the algorithms described in KoJain, *Algorithms for Clustering Data* (1988) can be used. Each cluster contains the data of users whose preferences tend to be similar. As such, when predicting the preferences of one user in a cluster, only the preferences of the other users in the cluster need to be examined and not the preferences of all other users in the database. A collaborative filtering system that utilizes a clustering algorithm receives as input a database, as described above, a guess of the number of clusters and a distance metric. The guess of the number of clusters is provided by an administrator of the collaborative filtering system based on their own knowledge of how many clusters the database can probably be divided into. The distance metric is a metric provided by the administrator for each user in the database that estimates how similar one user is to each other in the database based on user's preferences and attributes. The distance metric is a range between 0 and 1 with 0 indicating that two users are least similar and 1 indicating that two users are most similar. This similarity is expressed as a numerical value. Each user will have a distance metric for every other user. Thus, the distance metrics are conveniently represented by an N-by-N matrix, where "N" is the number of users. After receiving the number of clusters and the distance metric, the clustering algorithm identifies the clusters.

The clustering algorithm outputs a list of the users in the database and a cluster number assigned to each user. To determine the preferences of a user, the other users within that user's cluster are examined. For example, if the system is attempting to determine whether a user would like the television show "I Love Lucy," the other users within that cluster are examined. If there are six other users within the cluster and five out of the six like "I Love Lucy," then it is likely that so will the user.

Although utilizing a clustering algorithm is an improvement over the previously-described conventional system, it has limitations. One such limitation is that the exact number of clusters is determined manually, which renders the algorithm prone to human error. Another limitation is that all attributes are numerical and as such, the values of non-numerical attributes must be transposed into numerical values. Based upon the above-described limitations of conventional collaborative filtering systems, it is desirable to improve collaborative filtering systems.

SUMMARY OF THE INVENTION

The disclosed system provides an improved collaborative filtering system by utilizing a belief network, which is sometimes known as a Bayesian network. The disclosed system learns a belief network using both prior knowledge obtained from an expert in a given field of decision making and a database containing empirical data obtained from many users. The empirical data contains attributes of users as well as their preferences in the field of decision making. After initially learning the belief network, the belief network is relearned at various intervals when additional attributes are identified as having a causal effect on the preferences and data for these additional attributes can be gathered. This relearning allows the belief network to improve its accuracy at predicting preferences of a user. Upon each iteration of relearning, a cluster model is automatically generated which indicates a division of the database into a number of clusters that best predict the data in the database. After relearning the belief network a number of times, the belief network is used to predict the preferences of a user using probabilistic inference. In performing probabilistic inference, the known attributes of a user are received and the belief network is accessed to determine the probability of the unknown preferences of the user given the known attributes. Based on these probabilities, the preference most likely to be desired by the user can be predicted.

The disclosed system provides many advantages over conventional collaborative filtering systems. First, prior knowledge is utilized from an expert in a given field of decision making to seed the clustering, which produces clusters that more accurately reflect the data in the database than some conventional systems. Second, the number of clusters is determined automatically from the data in the database, which is more reliable than manually predicting and inputting the number of the clusters as done in some conventional systems. Third, no distance metric is needed by the disclosed system. This advantage helps reduce the mount of data that must be gathered before the system can be run. Fourth, the disclosed system can use non-numerical attributes so as to eliminate errors introduced to the system through the transposition of non-numerical values into numerical values. Fifth, the output of the disclosed system is a clustering model that is easily modifiable by an administrator so that it can be fed back into the system and improved upon by the system in an iterative manner. This iterative approach leads to improved accuracy in determining the preferences of a user. Other advantages of the disclosed system will become apparent to those skilled in the art upon reading the following description.

In accordance with a first aspect of the present invention, a method is provided in a collaborative filtering system for predicting a desired preference of a user based on attributes of the user. The method of the first aspect receives a belief network into the collaborative filtering system. The belief network contains attribute nodes and preference nodes. The attribute nodes reflect the attributes of the user and have a value. The preference nodes reflect available preferences of the user with each preference node having a probability indicating the likelihood that the available preference is the desired preference of the user. The first aspect receives a request, determines the available preference having the greatest likelihood of being the desired preference, and indicates the available preference having the greatest likelihood of being the desired preference.

In accordance with a second aspect of the present invention a collaborative filtering system is provided for predicting a desired preference of a user based on attributes of the user. The collaborative filtering system comprises a belief network, a receive component, a determination component, and an output component. The belief network contains attribute nodes and preference nodes. The attribute nodes reflect the attributes of the user and have a value. The preference nodes reflect available preferences of the user with each preference node having a probability. The receive component receives a request to determine an available preference having the greatest likelihood of being the desired preference. The determination component determines the available preference having the greatest likelihood of being the desired preference by evaluating the probabilities of the preference nodes. The output component indicates the available preference having the greatest likelihood of being the desired preference.

BRIEF DESCRIPTION OF THE DRAWINGS

FIG. 5 depicts the database of FIG. 3 in greater detail.

DETAILED DESCRIPTION OF THE INVENTION

Figure 1:
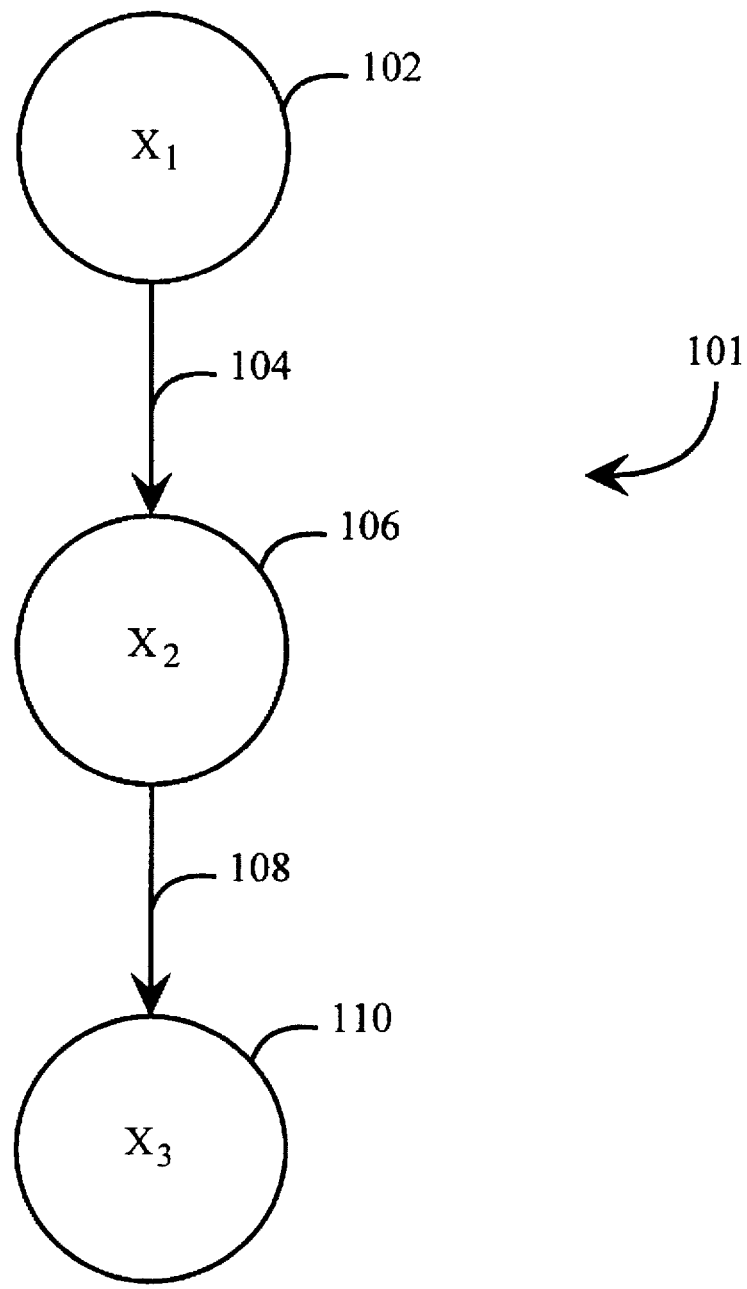
FIG. 1 depicts an example of a belief network.

A preferred embodiment of the present invention provides an improved collaborative filtering system by utilizing a belief network, which is sometimes known as a Bayesian network. The preferred embodiment "learns" a belief network using both prior knowledge obtained from an expert in a given field of decision making and a database containing empirical data obtained from many users. The empirical data contains attributes of users as well as their preferences in the field of decision making. After initially learning the belief network, the belief network is relearned at various intervals when additional attributes are identified as having a causal effect on the preferences and data for these additional attributes can be gathered. This relearning allows the belief network to improve its accuracy at predicting preferences of a user. Upon each iteration of relearning, a cluster model is automatically generated which indicates a number of clusters that best predicts the data in the database. After relearning the belief network a number of times, the belief network is used to predict the preferences of a user using probabilistic inference. In performing probabilistic inference, the known attributes of a user are received and the belief network is accessed to determine the probability of the unknown preferences of the user given the known attributes. Based on these probabilities, the set of preferences most likely to be desired by the user can be predicted.

The preferred embodiment of the present invention provides a number of advantages over conventional systems. First, prior knowledge is utilized from an expert in a given field of decision making to seed the clustering, which produces clusters that more accurately reflect the data in the database than some conventional systems. Second, the number of clusters is determined automatically from the data in the database, which is more reliable than manually predicting and inputting the number of the clusters as done in some conventional systems. Third, no distance metrics are needed by the preferred embodiment. This advantage helps reduce the mount of data that must be gathered before the system can be run and improves the accuracy of the system. Fourth, the preferred embodiment can use non-numerical attributes so as to eliminate errors introduced to the system through the transposition of non-numerical values into numerical values. Fifth, the output of the preferred embodiment is a clustering model that is easily modifiable by an administrator so that it can be fed back into the system and improved upon by the system in an iterative manner. This iterative approach leads to improved accuracy in determining the preferences of a user. Other advantages of the preferred embodiment will become apparent to those skilled in the art upon reading the following description.

Before delving into the details of the preferred embodiment, an overview of belief networks is provided so that the reader may better comprehend the details of the preferred embodiment.

INTRODUCTION TO BELIEF NETWORKS

A belief network is a representation of the probabilistic relationships among states of a portion of the world. The states of the world in a belief network can change and are, therefore, called variables. A belief network is expressed as an acyclic-directed graph where the variables correspond to nodes and the relationships between the nodes correspond to arcs. FIG. 1 depicts an example belief network 101. In the belief network 101 there are three variables, $x_1$, $x_2$, and $x_3$, which are represented by nodes 102, 106 and 110, respectively. The example belief network contains two arcs 104 and 108. Associated with each variable in a belief network is a set of probability distributions. Using conditional probability notation, the set of probability distributions for a variable can be denoted by $p(x_i | \Pi_i, \xi)$, where "p" refers to the probability distribution, where "$\Pi_i$" denotes the parents of variable $x_i$, and where "$\xi$" denotes the knowledge of the expert. The Greek letter "$\xi$" indicates that the belief network reflects the knowledge of an expert in a given field. Thus, this expression reads as follows: the probability distribution for variable $x_i$ given the parents of $x_i$ and the knowledge of the expert. For example, $x_1$ is the parent of $x_2$. The probability distributions specify the strength of the relationships between variables. For instance, if $x_1$ has two states (true and false), then associated with $x_1$ is a single probability distribution $p(x_1|\xi)$ and associated with $x_2$ are two probability distributions $p(x_2|x_1=t,\xi)$ and $p(x_2|x_1=f,\xi)$.

One important concept for belief networks is the concept of dependence. Sets of variables x and y are said to be conditionally independent, given a set of variables z, if the probability distribution for x given z does not depend on y. That is, if $p(x|z,y)=p(x|z)$, x and y are conditionally independent given z. If z is empty, however, x and y are said to be "independent" as opposed to conditionally independent. If x and y are not conditionally independent, given z, x and y are said to be conditionally dependent given z.

The arcs in a belief network convey dependence between nodes. When there is an arc from a first node to a second node, the probability distribution of the second node depends upon the value of the first node. For example, there is an arc from node 102 to node 106. Therefore, node 106 is said to be dependent on node 102. Missing arcs in a belief network convey conditional independence. For example, node 102 and node 110 are conditionally independent given node 106. That is, the values of nodes 102 and 110 are conditionally independent if the value of node 106 is known, the condition being the observation node 106. However, two variables indirectly connected through intermediate variables are dependent given lack of knowledge of the values ("states") of the intermediate variables. Therefore, if the value for $X_2$ is unknown, $X_1$ and $X_3$ are dependent.

The variables used for each node may be of different types. Specifically, variables may be of two types: discrete or continuous. A discrete variable is a variable that has a finite or countable number of states, whereas a continuous variable is a variable that has an able number of states. An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density $\rho(x)$ for a variable "x" and values "a" and "b" is defined as:

$$\rho(x) = \lim_{a \to b} \left[ \frac{\rho(a \le x \le b)}{|(a-b)|} \right]$$

Where $\rho(a \le x \le b)$ is the probability that x lies between a and b.

Figure 2:
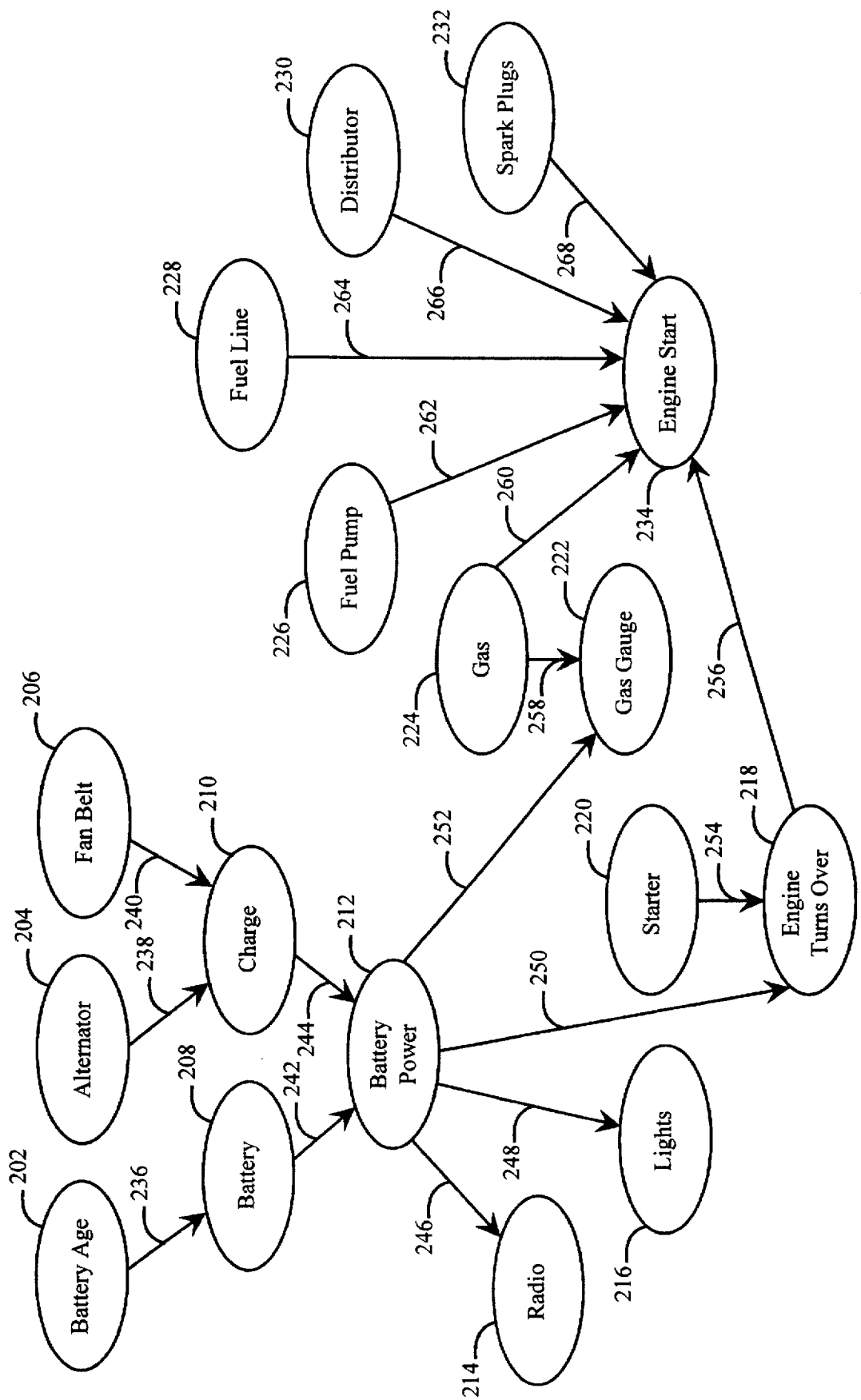
FIG. 2 depicts an example of a belief network for troubleshooting automobile problems.

FIG. 2 depicts an example belief network for troubleshooting automobile problems. The belief network of FIG. 2 contains many variables 202, 204, 206, 208, 210, 212, 214, 216, 218, 220, 222, 224, 226, 228, 230, 232, and 234, relating to whether an automobile will work properly and arcs 236, 238, 240, 242, 244, 246, 248, 250, 252, 254, 256, 258, 260, 262, 264, 266 and 268. A few examples of the relationships between the variables follow. For the radio 214 to work properly, there must be battery power 212 (are 246). Battery power 212, in turn, depends upon the battery working properly 208 and a charge 210 (arcs 242 and 244). The battery working properly 208 depends upon the battery age 202 (are 236). The charge 210 of the battery depends upon the alternator 204 working properly (are 238) and the fan belt 206 being intact (arc 240). The battery age variable 202, whose values lie from zero to infinity, is an example of a continuous variable that can contain an infinite number of values. However, the battery variable 208 reflecting the correct operations of the battery is a discrete variable being either true or false.

The automobile troubleshooting belief network also provides a number of examples of conditional independence and conditional dependence. The nodes operation of the lights 216 and battery power 212 are dependent, and the nodes operation of the lights 216 and operation of the radio 214 are conditionally independent given battery power. The concept of conditional dependence and conditional independence can be expressed using conditional probability notation. For example, the operation of the lights 216 is conditionally independent of the radio 214 given battery power. Therefore, the probability of the lights 216 working properly given both the battery power 212 and the radio 214 is equal to the probability of the lights working properly given the battery power alone, P(Lights|Battery Power, Radio, $\xi$)=P(Lights|Battery Power, $\xi$). An example of a conditional dependence relationship is the probability of the lights working properly 216 is conditionally dependent on the radio 214 given the battery 208. Therefore, the probability of the lights 216 working properly given both the radio 214 and the battery 208 is not equal to the probability of the lights given the battery alone. That is, P(Lights|Radio, Battery)≠ (Lights|Battery).

There are two conventional approaches for constructing belief networks. Using the first approach ("the knowledge-based approach"), a person known as a knowledge engineer interviews an expert in a given field to obtain the knowledge of the expert about the field of expertise of the expert. The knowledge engineer and expert first determine the distinctions of the world that are important for decision making in the field of the expert. These distinctions correspond to the variables of the domain of the belief network. The "domain" of a belief network is the set of all variables in the belief network. The knowledge engineer and the expert next determine the dependencies among the variables (the arcs) and the probability distributions that quantify the strengths of the dependencies.

In the second approach ("called the data-based approach"), the knowledge engineer and the expert first determine the variables of the domain. Next, data is accumulated for those variables, and an algorithm is applied that creates a belief network from this data. The accumulated data comes from real world instances of the domain. That is, real world instances of decision making in a given field. Conventionally, this second approach exists for domains containing only discrete variables.

A method for generating a belief network that is an improvement over these conventional approaches is described in pending U.S. patent application No. 08/240, 019, entitled "Generating Improved Belief Networks" assigned to a common assignee, which is hereby incorporated by reference. This improved method uses both expert knowledge and accumulated data to generate a belief network.

After the belief network has been created, the belief network becomes the engine for a decision-support system. The belief network is converted into a computer-readable form, such as a file, and input into a computer system. Then, the computer system uses the belief network to determine the probabilities of variable states given observations, determine the benefits of performing tests, and ultimately recommend or render a decision. Consider an example where a decision-support system uses the belief network of FIG. 2 to troubleshoot automobile problems. If the engine for an automobile did not start, the decision-based system could request an observation of whether there was gas 224, whether the fuel pump 226 was in working order by possibly performing a test, whether the fuel line 228 was obstructed, whether the distributor 230 was working, and whether the spark plugs 232 were working. While the observations and tests are being performed, the belief network assists in determining which variable should be observed next. Of the known conventional collaborative filtering systems, they do not use belief networks.

THE PREFERRED EMBODIMENT

Figure 3:
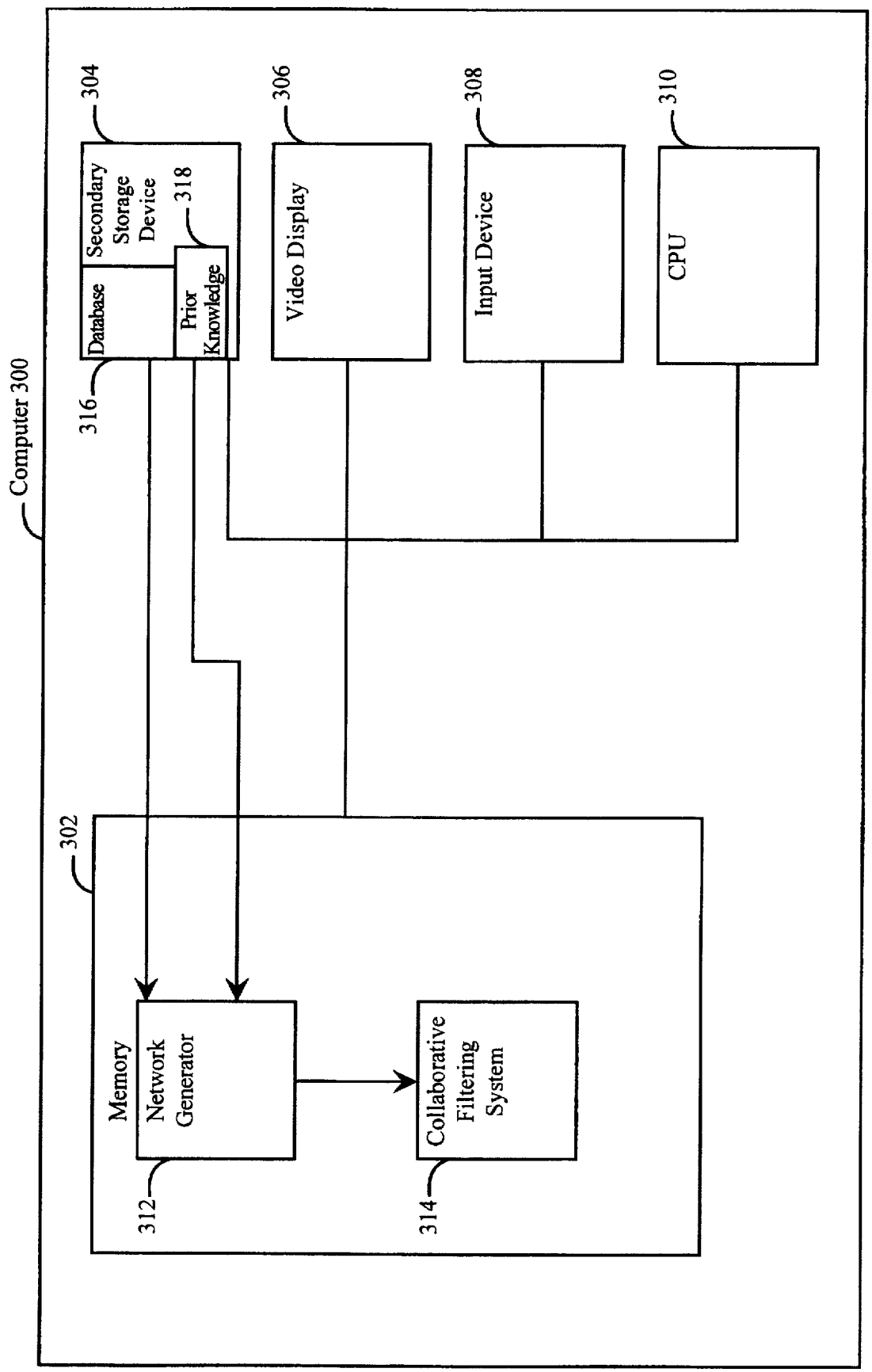
FIG. 3 depicts a computer system suitable for practicing the preferred embodiment oft he present invention.

As previously stated, the collaborative filtering system of the preferred embodiment utilizes a belief network. The preferred embodiment first learns a belief network using prior knowledge and a database and then utilizes the belief network to perform probabilistic inferences. FIG. 3 depicts a block diagram of a computer 300 suitable for practicing the preferred embodiment of the present invention. The computer 300 contains a memory 302, a secondary storage device 304, a video display 306, an input device 308 and a central processing unit (CPU) 310. The memory 302 contains a network generator 312 and a preferred collaborative filtering system 314. The secondary storage device 304 contains a database 316 and prior knowledge 318. The network generator 312 is responsible for generating a belief network based on the prior knowledge 318 and information contained within the database 316. After generating the belief network, the network generator 312 passes the belief network to the collaborative filtering system 314 which then utilizes the belief network in determining the preferences of a user.

Figure 4:
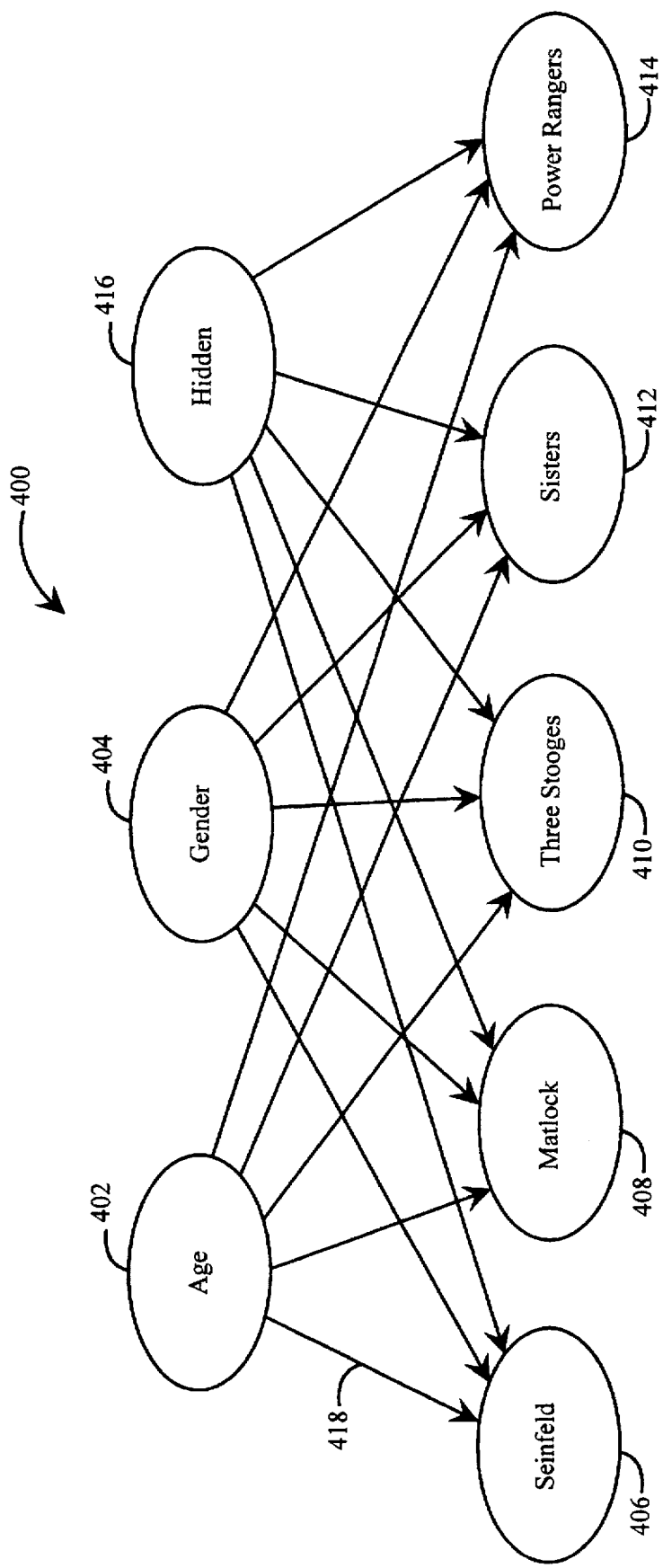
FIG. 4 depicts a belief network that reflects prior knowledge.

The prior knowledge 318 includes a belief network with all variables being discrete and with arcs between the variables. FIG. 4 depicts an example belief network 400 utilized by the preferred embodiment to determine preferences of a user for a television show. In the preferred embodiment, belief networks are implemented as an acyclic directed graph data structure with the variables in the belief network corresponding to nodes in the data structure. The belief network 400 contains a number of variables (or nodes) 402, 404, 406, 408, 410, 412, 414 and 416. Two of these variables, 402 and 404, reflect causal attributes and are sometimes referred to as causal variables. A "causal attribute" is an attribute that has a causal effect on caused attributes. The caused attributes in the belief network 400 are reflected by variables 406, 408, 410, 412 and 414. These variables are known as caused attributes (or caused variables) because their value is causally influenced by the causal variables. Caused attributes can be of two types: preference or non-preference. Preference caused attributes contain the preferences to be predicted. Non-preference caused attributes are causally influenced by the causal attributes, but are not preferences because the system is not used to predict their value. Non-preference caused attributes are further discussed below. For example, variable 414 is a preference caused attribute indicating whether a particular user likes the "Power Rangers" television show and variable 402 is a causal attribute whose value has a causal effect on variable 414. That is, since "Power Rangers" is primarily enjoyed by children, the younger the age variable, the more likely it is that the user will enjoy the "Power Rangers" show.

The belief network 400 also contains a hidden causal attribute 416, which is sometimes referred to as a hidden causal variable. A hidden causal attribute is a factor that is believed to causally influence the caused attributes, but which is currently unobserved. That is, the administrator that created the belief network believes that there is an unobserved factor that is not currently identified. For example, the administrator may believe that another factor such as income or education may also have a causal effect on whether someone likes "Power Rangers," but until the administrator can verify this belief, the factor remains unobserved. The process of verifying the existence of a factor is further discussed below.

The prior knowledge 318 is used to indicate which variables in the belief network 400 are causal attributes, hidden causal attributes, and caused attributes. In addition, the prior knowledge 318 is used to determine which causal attribute affects a caused attribute by indicating an arc from the causal attribute to the caused attribute. For example, arc 418 indicates that the causal attribute age 402 has an effect on whether somebody watches the television show "Seinfeld."

In addition to providing the belief network 400, as part of the prior knowledge 318, an administrator also supplies a prior probability that indicates the administrator's level of confidence that the belief network adequately predicts the preferences of the user and a range of a number of states for any hidden variables in the belief network 400. For example, the administrator may indicate that the hidden variable 416 contains between five and ten states based on their own knowledge. Each of these states corresponds to a cluster of users in the database that have similar preferences, Which is discussed in more detail below. The preferred embodiment during its processing will determine which number of these states most accurately reflects the data in the database 316. In other words, the preferred embodiment will determine a number within the range that is the best grouping of clusters in the database 316 using a method described below.

FIG. 5 depicts the database 316 in greater detail. The database 316 contains a number of records 502, 504, and 506 which are each referred to as a case. One skilled in the art will appreciate that although three cases are depicted, the database 316 will usually contain many more cases. Each case 502, 504, 506 indicates observed data for a particular user. Each case typically contains a value for each variable in the belief network 400 except for the hidden causal attributes. For example, case 502 reflects a user who is 13 years old, female, and likes the "Seinfeld" TV show, the "Sisters" TV show and the "Power Rangers" TV show, but dislikes both "Matlock" and the "Three Stooges." In some situations, a value for a variable will be missing from a case. This may occur, for example, when an attribute is not observed for a user. In this situation, during the processing of the preferred embodiment, the missing value is estimated.

Figure 6:
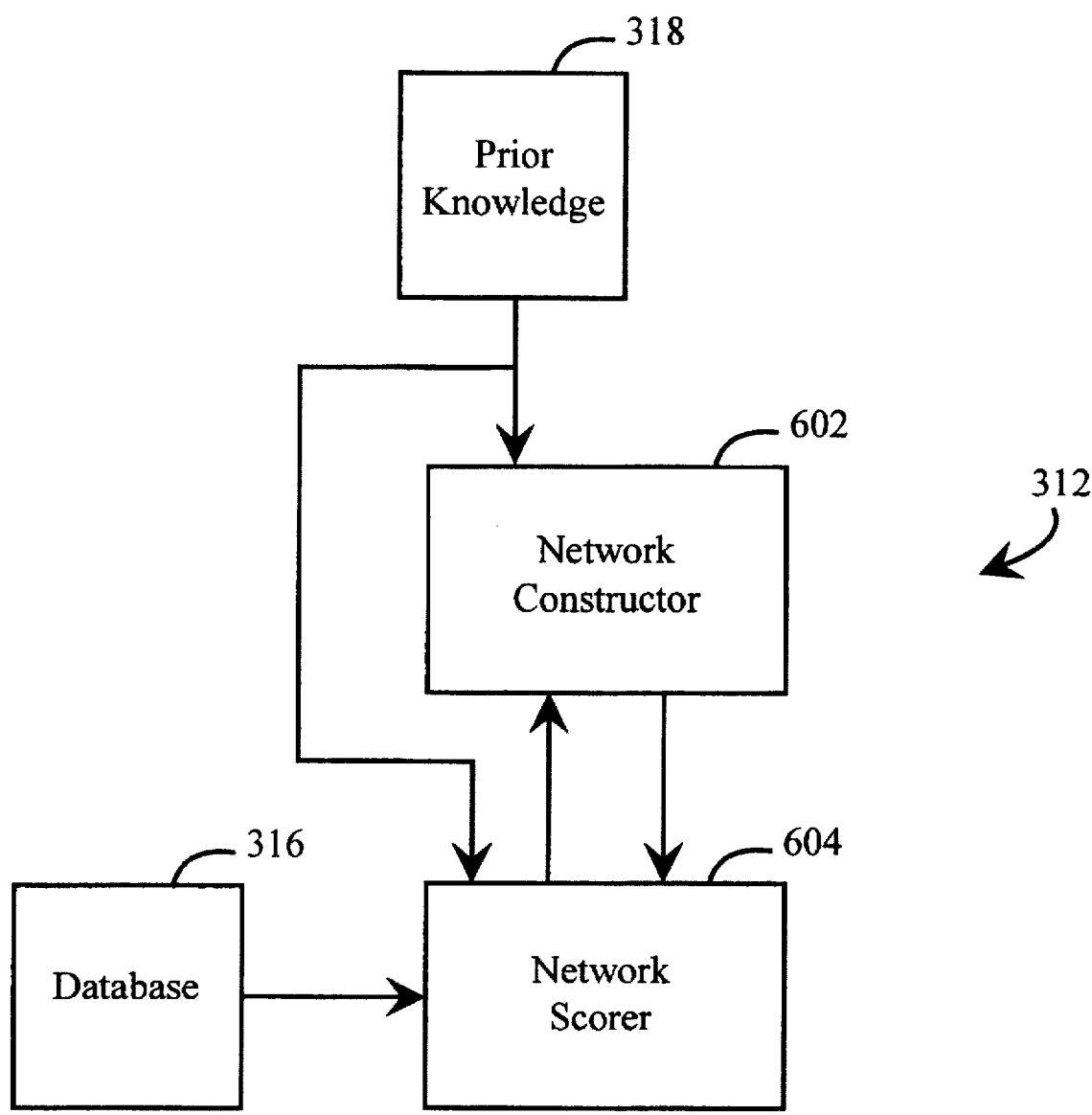
FIG. 6 depicts the network generator of FIG. 3 in greater detail.

FIG. 6 depicts the network generator 312 in greater detail. The network generator 312 comprises a network constructor 602 and a network scorer 604. The network constructor 602 receives the prior knowledge 318 and constructs a belief network for each combination of hidden causal attributes and their states. For example, if the prior knowledge indicates the hidden variable may have 5–10 states, then the network constructor 602 constructs six belief networks: a belief network with a hidden variable with five states, a belief network with a hidden variable with six states, etc. After generating each belief network, the network constructor 602 sends each belief network to the network scorer 604 which scores the belief network for goodness in predicting preferences of a user by utilizing the data in the database 316. For example, the network scorer 604 may determine that the belief network with a hidden variable having five states is the best. After scoring each belief network, the network scorer 604 sends the scores to the network constructor 602 which sends a belief network with the best score to the collaborative filtering system 314 for use in predicting preferences of a user.

Figure 7:
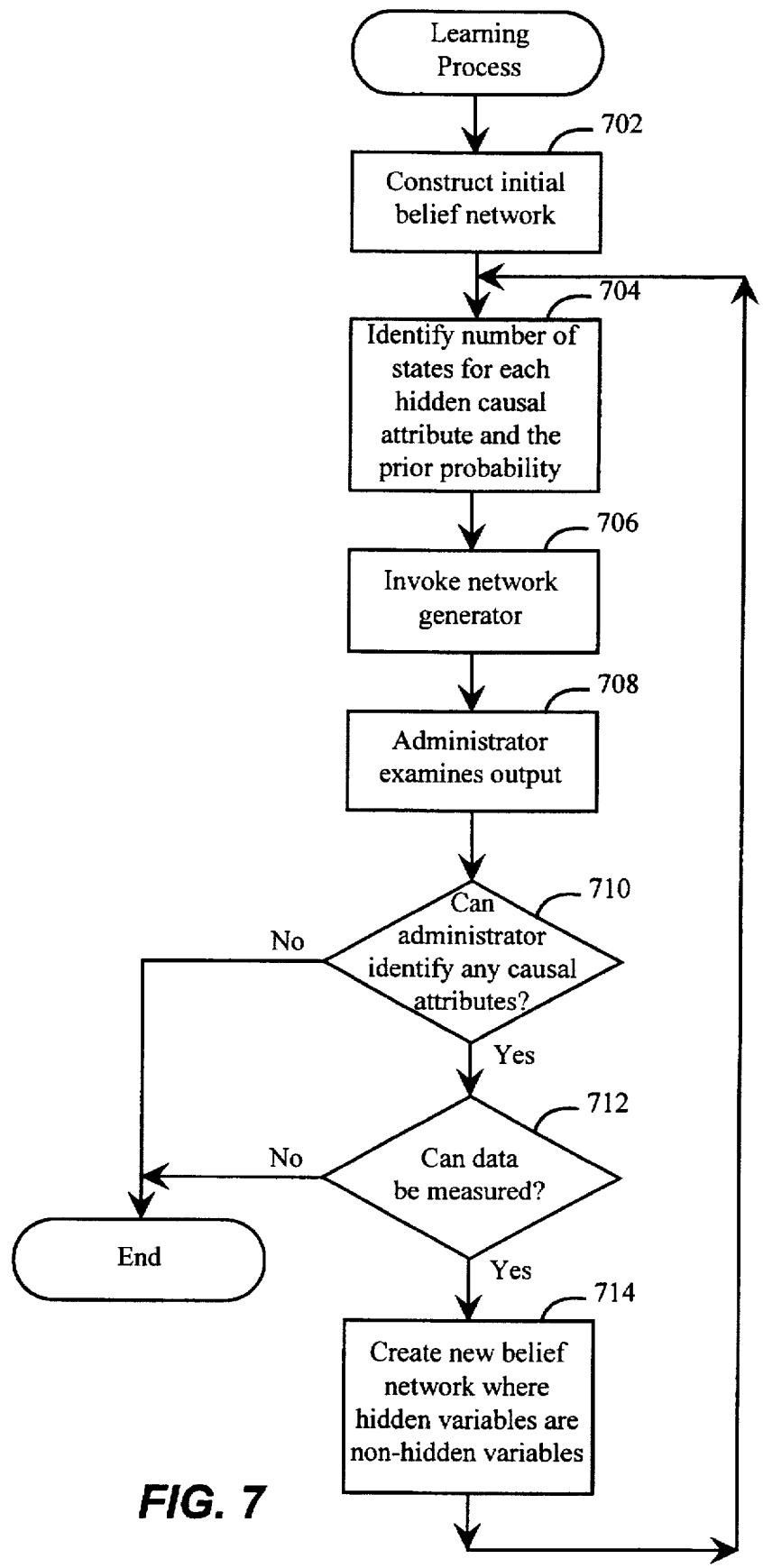
FIG. 7 depicts a flowchart of the steps performed when learning a belief network to be utilized in the collaborative filtering system depicted in FIG. 3.
Figure 8:
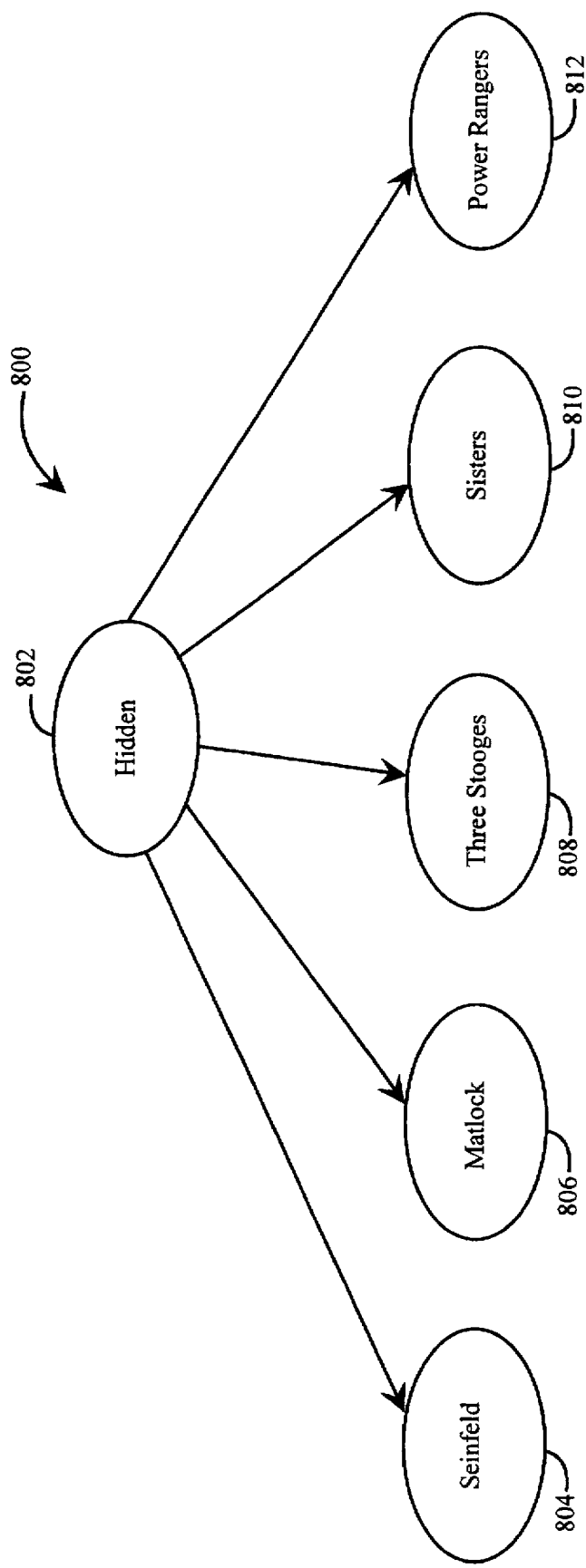
FIG. 8 depicts an initial belief network to be used in the learning process of FIG. 7.

As previously stated, the preferred embodiment first learns a belief network and then performs probabilistic inferences using the belief network. This learning process is performed by an administrator first generating the prior knowledge through constructing an initial belief network with at least one hidden variable, creating the prior probability and identifying a range of a number of states for the hidden variable. After generating the prior knowledge, the administrator iterates through a process in the system which improves the accuracy of the belief network. FIG. 7 depicts a flowchart of the steps performed during the learning process. The first step performed in the learning process is for the administrator to construct an initial belief network (step 702). In this step, the administrator determines the field of decision making in which the collaborative filtering system will operate and then determines the available preferences that the system may choose for a user. For example, the field of decision making may be television shows with the available preferences being "Seinfeld," "Sisters," "Three Stooges," "Matlock" and "Power Rangers." Then, the administrator consults with an expert to determine any causal attributes that have a causal effect on the preferences and for which data (or observations) is available. For example, the observations may be derived from a survey which contains the ages of people who typically watch a particular show. After receiving this information, the administrator constructs an initial belief network with causal attributes, caused attributes and at least one hidden attribute. However, in many situations, the causal attributes are not known at this time and therefore, the learning process begins with an initial belief network like the one shown in FIG. 8. The initial belief network 800 contains a hidden causal attribute 802 and caused attributes 804, 806, 808, 810 and 812 that reflect the preferences to be predicted by the collaborative filtering system. No causal attributes are indicated at this time since the administrator is sometimes unaware of the causal attributes at the beginning of the learning process. However, the administrator estimates the number of hidden causal attributes that may have a causal effect on the preferences. One skilled in the art will appreciate that the initial belief network may contain additional nodes, additional levels of nodes or additional arcs between the nodes. The use of a two-level belief network is used to simplify the explanation.

The collaborative filtering system 314 provides user interactive functionality to assist the user in the creation of the belief network. This functionality allows a user to create nodes and arcs in a belief network by using the input device 308. The belief network is displayed in a graphical form to the user on the video display 306. As the user creates the belief network by manipulating the input device 308, the collaborative filtering system 314 creates an acyclic directed graph data structure to represent the belief network and creates nodes in the acyclic directed graph data structure to represent variables in the belief network. The nodes in the acyclic directed graph data structure can store both numerical values, as well as non-numerical values, such as text strings. The arcs in the belief network are implemented as arcs in the acyclic directed graph data structure.

After constructing the initial belief network, the administrator identifies the number of states for each hidden causal attribute and identifies the prior probability (step 704). In this step, the administrator provides a range of the number of states that the administrator believes will indicate the number of clusters within the database for each hidden variable. Additionally, the administrator provides the prior probability which is an estimate of their level of confidence in the structure of the belief network. Next, the network generator 312 is invoked and passed an initial belief network, the range of the number of states for each hidden causal attribute, and the prior probability (step 706). The network generator determines which of the states of the hidden causal attribute 802 best predicts the data in the database. The network generator performs its functionality by invoking the network constructor to create all combinations of possible belief networks and then invoking the network scorer to determine which of these belief networks has the best score. The belief network with the best score is then identified and output. This belief network contains a hidden causal attribute with a number of states. The number of states of the hidden causal attribute reflects the number of clusters that best predicts the data. After invoking the network generator, the administrator examines the identified belief network and the cluster for each state of the hidden causal attribute (step 708). Each cluster (state) reflects a ranking of the preference nodes for each state of the hidden causal attribute. For example, assume that the prior knowledge included a range of between five and ten states for the hidden causal attribute 802. Further, assume that the network generator selected the belief network with five states for the hidden causal attribute as the one that best predicts the data. In this example, the cluster output ("the cluster model") would be similar to that shown in FIG. 9.

Figure 9:
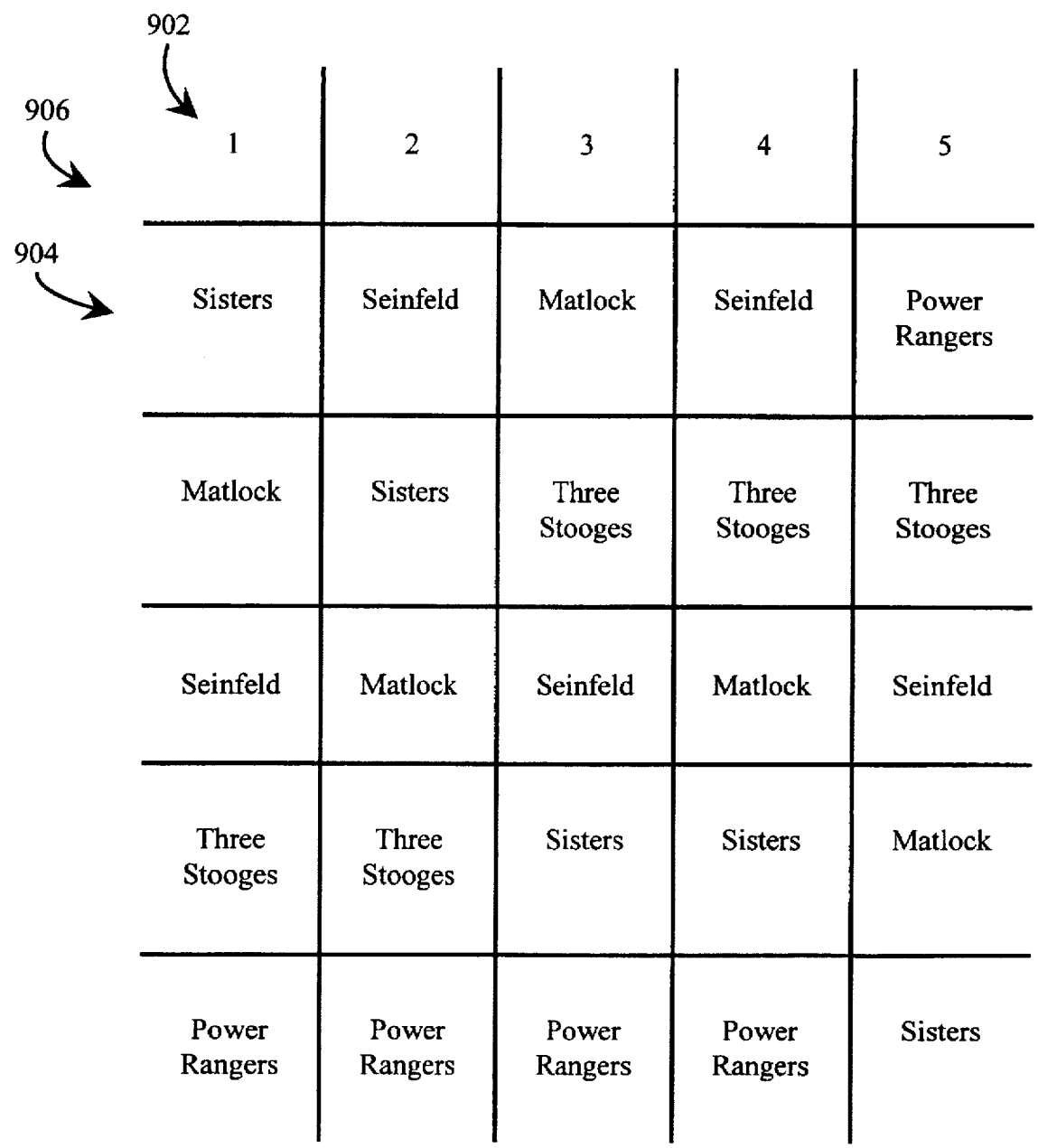
FIG. 9 depicts a cluster model that is output by the network generator of FIG. 3.

FIG. 9 depicts an example cluster model 900 where the number of states is indicated on the top row 902. Under each state is a ranked listing of the preferences 904 of the users within that cluster. For example, in cluster number 1, the users most liked the TV show "Sisters" and least liked the TV show "Power Rangers." After examining the output of the clusters, the administrator determines whether they can identify any causal attributes (step 710). In this step, the administrator examines the cluster model to determine if they can identify any causal attributes based on their knowledge. For example, the administrator may know that the TV show "Power Rangers" is a children's show and as such, the administrator may determine that one causal attribute is probably age, since some clusters least liked "Power Rangers" and one cluster, cluster 5, most liked "Power Rangers." In addition, based on the administrator's knowledge that the "Three Stooges" is generally favored by men and disfavored by women, the administrator may choose gender to be a causal attribute. In this example, the administrator has been able to identify both age and gender as causal attributes. However, sometimes the administrator may be unable to identify any causal attributes and in this case, processing ends.

If the administrator is able to identify one or more causal attributes, processing continues to step 712 where the administrator determines whether data can be measured for the identified causal attributes (step 712). In the example where both gender and age have been determined to be causal attributes, data can be gathered. That is, a survey can be taken to determine the likes and dislikes of both men and women who are of various ages. If the data cannot be measured, processing ends. However, if the data can be measured, a new belief network is created where the hidden causal attributes are converted into non-hidden causal attributes (step 714). In the continuing example, based upon the clustering output of FIG. 9, the administrator may change the initial belief network depicted in FIG. 8 to resemble the belief network depicted in FIG. 4. When creating the belief network, the administrator chooses the number of states for each newly-added causal variable. Where the number of states is implicit from the nature of the causal variable (e.g., gender), the choice is simple. However, the choice is a little more difficult when there is more than one causal variable identified and this causal variable (e.g., age) can have a number of states. In this situation, the administrator chooses a number of states based on common sense knowledge. For example, if the belief network is used to predict whether a user likes cartoons, the administrator may choose two states for the age variable (e.g., <10 and ≧10). Alternatively, one skilled in the art will appreciate that the preferred embodiment can be used to help the administrator identify the best number of states. After creating the new belief network, processing continues to step 704 where the administrator identifies a number of states for each of the hidden variables. Steps 704 to 714 continue until either the administrator cannot identify any causal attributes or data cannot be measured. Upon the occurrence of either of these two events, the resulting belief network is passed to the collaborative filtering system for rendering probabilistic inferences.

Figure 10:
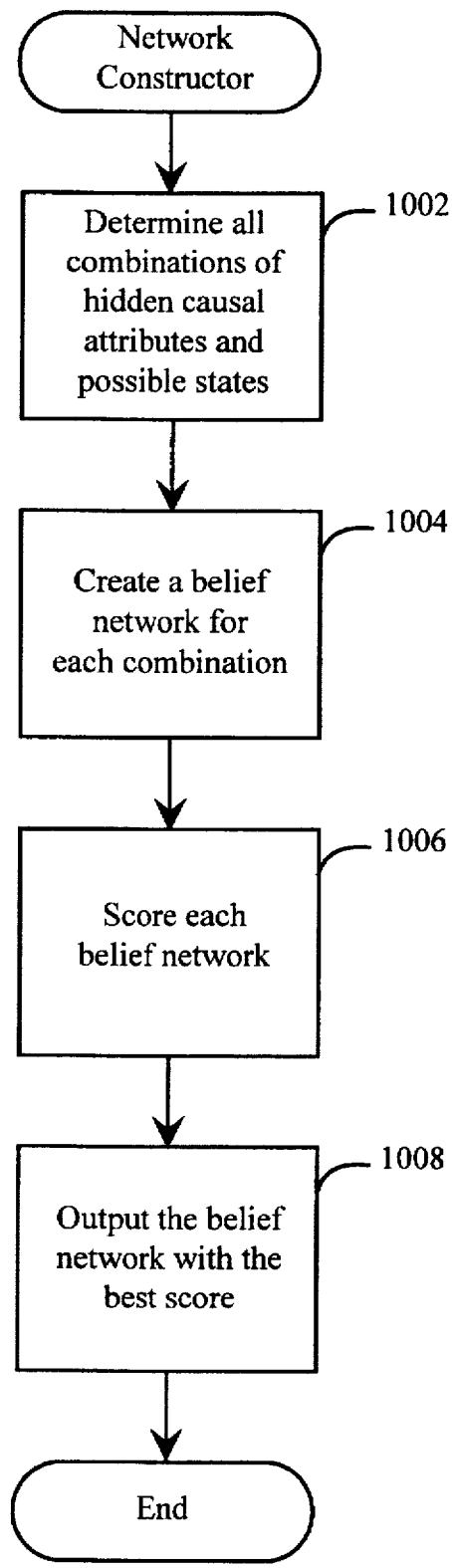
FIG. 10 depicts a flowchart of the steps performed by the network constructor of FIG. 6.

FIG. 10 depicts a flowchart of the steps performed by the network constructor of the preferred embodiment. The network constructor creates all combinations of possible belief networks based on the number of hidden causal attributes and the number of states for each hidden causal attribute. The network constructor then invokes the network scorer to determine which of the belief networks has the best score. The first step the network constructor performs is to determine all combinations of hidden causal attributes and possible states (step 1002). In this step, the network constructor determines the number of hidden causal attributes, determines all states within the specified ranges for the hidden causal attributes, and calculates all possible combinations. For example, if a belief network had two hidden causal attributes with the first having a range of states of 5–6 and the second having a range of states of 9–10, the following combinations would be calculated: the first hidden causal attribute having 5 states and the second hidden causal attribute having 9 states, the first hidden causal attribute having 5 states and the second hidden causal attribute having 10 states, the first hidden causal attribute having 6 states and the second hidden causal attribute having 9 states, and the first hidden causal attribute having 6 states and the second hidden causal attribute having 10 states. Next, the network constructor creates a belief network for each combination determined in step 1002 (step 1004). After creating the belief networks, the network constructor invokes the network scorer to render a score for each of the belief networks (step 1006). The processing of this step is discussed in greater detail below. After receiving the scores for each belief network, the network constructor outputs the belief network having the best score. The user may then use the belief network to output the cluster model by selecting each state of the hidden causal variable. The selection of each state of the hidden causal variable will generate a ranked listing of the preferences (i.e., an indication of a cluster).

Figure 11:
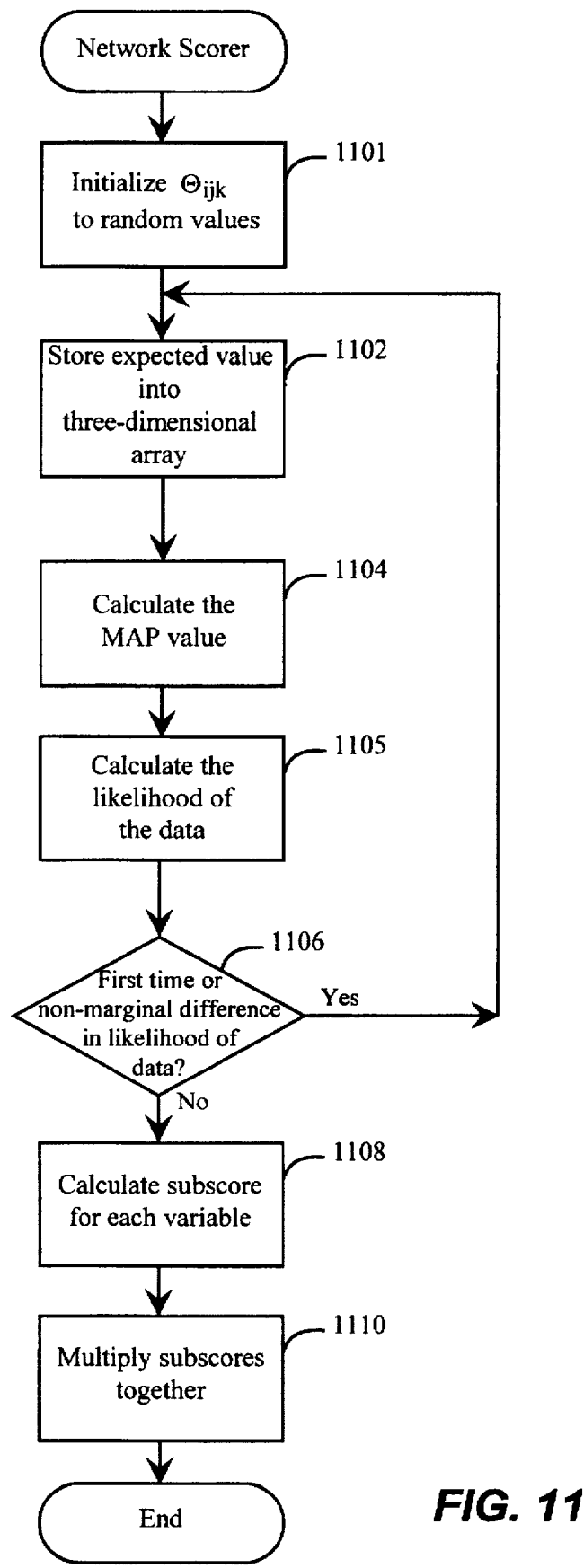
FIG. 11 depicts a flowchart of the steps performed by the network scorer of FIG. 6.

FIG. 11 depicts a flowchart of the steps performed by the network scorer 604 of the preferred embodiment. The network scorer is responsible for calculating values for a hidden variable for each of its states as well as for creating values for any data missing from any of the cases in the database 316. This is done by calculating the expected value of the sufficient statistics for each variable, for each state of the parents of the variable, and for each state of the variable. The network scorer then calculates a probability estimate for each variable given that variable's parents and the instance of the variable. This processing is performed by utilizing an algorithm known as the "EM" algorithm, which, as recognized by those skilled in the art, calculates the maximum a posteriori values ("MAP values") for the parameters of the belief network. The EM algorithm is described in Dempster, *Maximum Likelihood From Incomplete Data Via The EM Algorithm*, Journal of the Royal Statistical Society B, Volume 39 (1977). After calculating the probability for each variable, each variable within the belief network is then scored for goodness in predicting the preferences of the user by rendering a subscore. As recognized by those skilled in the art, the subscores are generated by using the marginal likelihood of the expected data at the maximum a posteriori values.

In computing the subscore, the network scorer maintains an array "N" with three subscripts i, j and k. The subscript "i" refers to the variable, the subscript "j" refers to an instance of the parents of the variable, and the subscript "k" refers to the instance of the variable. For example, with respect to FIG. 4, variable 406 has three parents 402, 404, 416 and two states: either true or false. The parents of variable 406 can each have a number of instances (e.g., variable 404, gender, has two instances: male and female and variable 402, age, may have three instances). Each variable given each instance of the parents of the variable is associated with a set of parameters $\{\theta_{ij1}, \ldots, \theta_{ijr_i}\}$. Where "i" is the variable index; "i=1 ... n," where "n" is the number of variables in the belief network. Where "j" is the parent-instance index; "j=1 ... $q_i$,", where $q_i$ is the number of all combinations of instances of the parents. For example, if i corresponds to node 406, the parents of node 406 are variables 404 and 416 that each have two states and variable 402 has five states, and therefore, $q_i$=20 (i.e., 2×2×5). Where "k" is the variable state index; "k=1 ... $r_i$", where "$r_i$" is the number of states of variable i. For example, since variable 406 has two states, $r_i$=2. The parameter $\theta_{ijk}$ is the long run fraction for $x_i$=k, when $\Pi_i$=j. That is, for all values of i, j, and k, $p(x_i=k|\Pi_i=j,\theta_{ijk}, S^h, \xi)=\theta_{ijk}$, where $S^h$ is the hypothesis that the correct network structure is S. That is, $S^h$ is the hypothesis that the true joint distribution of the domain, which is the set of all variables, factors according to the Belief Network Structure S. The set of all parameters for all variables in the belief network is referred to as $\theta_s$.

The preferred embodiment assumes that the parameter sets $\{\theta_{ij1}, \ldots, \theta_{ijr_i}\}$ in $\theta_s$ are mutually independent. In addition, the preferred embodiment assumes that the density of each parameter set $\{\theta_{ij1}, \ldots, \theta_{ijr_i}\}$ has a Dirichlet distribution as defined by:

$$\rho(\theta_{ij1}, \ldots, \theta_{ijr_i}|S^h,\xi) = \frac{\Gamma\left(\sum_{k=1}^{r_j}(e_{ijk}+1)\right)}{\prod_{k=1}^{r_j}\Gamma(e_{ijk}+1)} \prod_{k=1}^{r_j} \theta_{ijk}^{e_{ijk}}, e_{ijk} > -1$$

where "$\Gamma()$" is the Gamma function defined as $$\Gamma(x) = \int_0^\infty e^{-y} y^x dy.$$

The exponents are an empirically derived constant:

$$e_{ijk} = (1+\epsilon)$$

where "$\epsilon$"=0.01. These assumptions are made to render the computations associated with the scoring of the belief network practical. If these assumptions do not hold true, the scoring of the belief network, under certain circumstances, will be less accurate. One skilled in the art will appreciate that other assumptions could be made upon which other calculations could be performed to score the belief network.

The first step performed by the network scorer of the preferred embodiment is to initialize all $\theta_{ijk}$ to random values (step 1101). Next, the network scorer stores an expected value for each variable, for each instance of the parents of the variable, and for each instance of the variable into a three-dimensional array "$N_{ijk}$" (step 1102). One skilled in the art will appreciate that this step calculates the expected sufficient statistics for each variable. In this step, the expected value for each $N_{ijk}$ is calculated using the following formula:

$$E(N_{ijk}|\theta_s) = \sum_{l=1}^m p(x_i=k, \pi_i=j|C_l, \theta_s, \xi)$$

where "$E(N_{ijk}|\theta_s)$" refers to the expected value of $N_{ijk}$. "$p(x_i=k, \pi_i=j|C_l, \theta_s, \xi)$" refers to the probability of variable $x_i$ equaling state k and the parent of variable $x_i$ equaling state j in case $C_l$ given case "$C_l$" and the set of all parameters. In this step, the formula calculates the expected value and accounts for missing data (or observations) in a case. For example, assume that there are 100 cases in the database. Also assume that the gender variable 404 is being processed by the formula and that there are 30 observations in the database for the gender viable being male, 69 observations for the gender variable being female and one missing observation. Since the gender variable 404 does not have a parent, this calculation is rather simplified. Further assume that $\theta$ has been initialized for the male state to 0.1 meaning that 0.1 is the likelihood of the gender variable being male and 0.9 is the likelihood of the gender variable being female. This formula accounts for the missing observation by using $\theta$ to estimate the value of the missing data. In this example, the missing observation is estimated to be 0.1 male and 0.9 female. Therefore, the expected value of the sufficient statistics for the gender variable being male is 30.1 (i.e., 30 observations of male and one missing observation valued at 0.1) and the expected value of the sufficient statistics of the gender viable being female is 69.9 (i.e., 69 observations of female and one missing observation valued at 0.9).

The calculation of the expected value is a little more complicated when the variable has a parent. For example, assume that the expected value of the Seinfeld variable is being calculated. Further assume that it only has one parent, gender. As such, the Seinfeld variable will have four expected values (i.e., two states for the Seinfeld variable multiplied by the two states of the parent). If there were 100 cases in the database without missing data where males liked Seinfeld in 25 cases, males disliked Seinfeld in 10 cases, females liked Seinfeld in 35 cases and females disliked Seinfeld in 30 cases, the expected values (in this situation these are actual values since there is no missing data) would be as follows:

| Seinfeld | Gender | Expected Value |
| --- | --- | --- |
| True | Male | 25 |
| False | Male | 10 |
| True | Female | 35 |
| False | Female | 30 |

Next, the network scorer calculates the MAP value for each variable, for each instance of the parents of the variable, and for each instance of the variable given the expected values of the sufficient statistics (step 1104). In this step, the MAP value for each variable is calculated using the following formula:

$$\theta_{ijk} = \frac{E(N_{ijk}|\theta_s) + (1+\epsilon)}{\left[\sum_{k=1}^{r_i} E(N_{ijk}|\theta_s)\right] + r_i(1+\epsilon)}$$

Where $\theta_{ijk}$ is the MAP value, where $\epsilon$=0.01 is an empirically derived constant and "$r_i$" is the number of states of the variable. The MAP values for a variable are stored in the corresponding node in the belief network. After calculating the MAP value, the network scorer calculates the likelihood of the data evaluated at the current MAP estimate of $\theta_s$ by computing $p(C_1 \ldots C_m|\theta_s, S^h, \xi)$ (step 1105). In this step, the probability for each case is calculated for all observed variables in the case. One skilled in the art will recognize that any standard belief network inference algorithm can be used to perform this step, such as the one described in Jensen, Lauritzen and Olesen, *Bayesian Updating in Recursive Graphical Models by Local Computations, Technical Report R-89-15,* Institute of Electronic Systems, Aalborg University, Denmark. For example, with respect to the database 316 of FIG. 5, the probability of case 502 is calculated by multiplying the $\theta$ for each preference together given that age=13, gender=female and the hidden variable=s (some state s). That is, the $\theta$ for Seinfeld=yes when age=13, gender=female and the hidden variable=S may be 0.1. This value is multiplied by the similar $\theta$ for all of the other preferences to generate a probability for the case given the state of the hidden variable. The weighted average of this probability is then computed over all states of the hidden variables to yield the probability of each case. After the probabilities for each case are calculated, they are multiplied together. After calculating the likelihood of the data, the network scorer determines if steps 1102–1105 were performed for the first time or whether there is a non-marginal difference in the likelihood of the data (step 1106). In other words, steps 1102–1105 are performed at least twice and the likelihood of the data for the most recent iteration is retained. The difference between the current and the most recent likelihood of the data are compared to determine if their differences are marginal (i.e., negligible). The determination of whether the differences are marginal is performed by comparing the differences to a predefined constant, such as 0.0001. When the difference between the likelihood of the data is marginal, the algorithm is reaching diminishing returns. When the difference becomes marginal, the network scorer calculates a score for the belief network. This score is an approximation of the average of the expected values of the sufficient statistics given $\theta_s$ over all $\theta_s$. The score is calculated by calculating a subscore for each variable (step 1108).

This subscore is performed by using the following formula:

$$\prod_{j=1}^{q_i} \frac{\Gamma(r_i(1+\epsilon))}{\Gamma(E(N_{ij}|\theta_s) + r_i(1+\epsilon))} \cdot \prod_{k=1}^{r_i} \frac{\Gamma(E(N_{ijk}|\theta_s) + (1+\epsilon))}{\Gamma(1+\epsilon)}$$

The term $$" \prod_{j=1}^{q_i} \frac{\Gamma(r_i(1+\epsilon))}{\Gamma(E(N_{ij}|\theta_s) + r_i(1+\epsilon))} "$$

is the product for all states "j" of the parents of variable $x_i$. The numerator is the Gamma function "$\Gamma$" of the number of the states of the variable "$r_i$" multiplied by 1 plus "$\epsilon$." The denominator is the Gamma function "$\Gamma$" of the expected value of "$N_{ij}$" given the set of all parameters "$\theta_s$" plus $r_i$ (1+$\epsilon$). The term $E(N_{ij}|\theta_s)$ is equivalent to $$\sum_{k=1}^{r_i} E(N_{ijk}|\theta_s).$$

The term $$" \prod_{k=1}^{r_i} \frac{\Gamma(E(N_{ijk}|\theta_s) + (1+\epsilon))}{\Gamma(1+\epsilon)} "$$

is the product for all states of variable $x_i$. The numerator is the Gamma function of the expected value of $N_{ijk}$ given the set of all parameters $\theta_s$ plus (1+$\epsilon$). The denominator is the Gamma function of (1+$\epsilon$). After calculating a subscore for each variable, a total score for the belief network is calculated by multiplying the subscores for each variable together and multiplying this product by the prior probability of the network structure (step 1110). Alternatively, the total score can be calculated by multiplying the total score as obtained in step 1110 by $$\frac{P(C_1 \ldots C_m|\theta_s, S^h, \xi)}{\prod_{i=1}^{n} \prod_{j=1}^{q_i} \prod_{k=1}^{r_i} \theta_{ijk}^{E(N_{ijk}|\theta_s)}}.$$

The MAP value of the parameters of the belief network have been stored in the nodes of the belief network in the last iteration of step 1105. As such, the MAP values can now be used for probabilistic inference.

Figure 12:
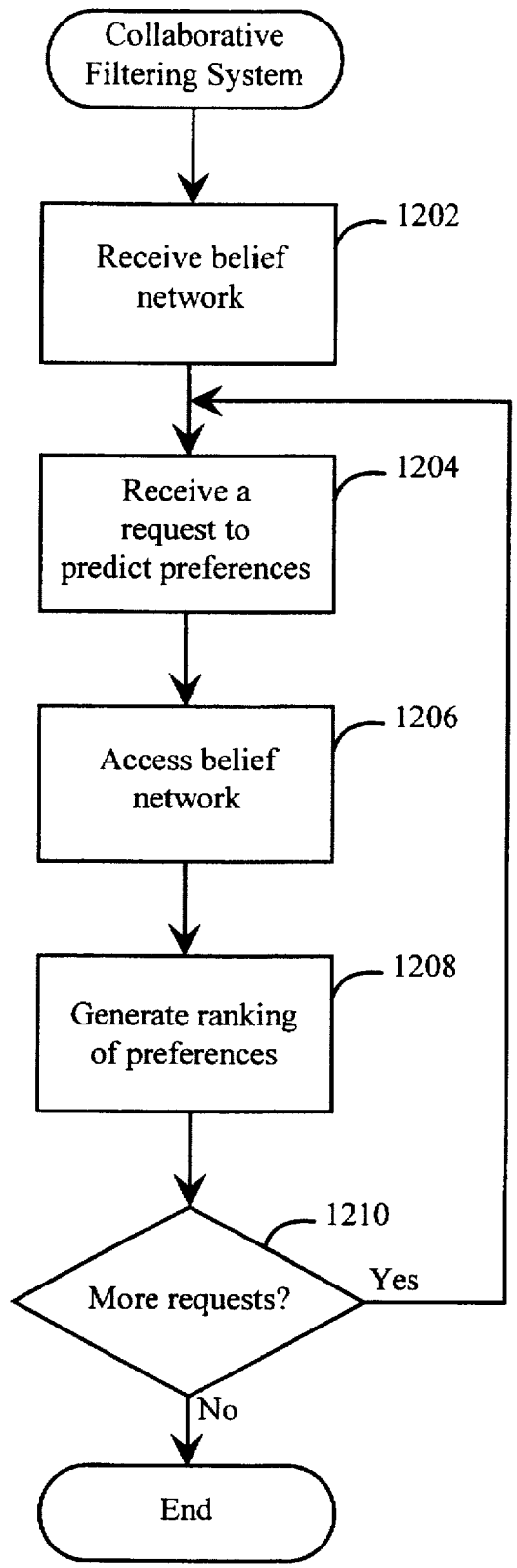
FIG. 12 depicts a flowchart of the steps performed by the collaborative filtering system of FIG. 3.

As previously stated, after learning a belief network, the belief network is used by the collaborative filtering system to predict preferences of the user. FIG. 12 depicts a flowchart of the steps performed by the collaborative filtering system 314 of the preferred embodiment. The first step performed by the collaborative filtering system is to receive a belief network from the network generator (step 1202). After receiving the belief network, the collaborative filtering system receives a request from an administrator to predict the preferences of a user (step 1204). Within the request are observations of various causal attributes of the user and possibly known preferences of the user. For example, if the collaborative filtering system were using the belief network of FIG. 4, the type of information that would be received could be the user's age, gender and the fact that the user likes Seinfeld. After receiving this information, the collaborative filtering system accesses the belief network (step 1206). Using the values of the causal attributes, the collaborative filtering system accesses the belief network and computes the probability of the states of each preference node given the information received in step 1204 using any standard belief network inference algorithm, such as the one described in Jensen, Lauritzen and Olesen, *Bayesian Updating in Recursive Graphical Models by Local Computations, Technical Report R-89-15,* Institute of Electronic Systems, Aalborg University, Denmark. After calculating the probabilities, the probabilities are used to generate a ranking of the preferences (step 1208). For example, in the belief network of FIG. 4, assume that the hidden variable has two states (t and f) and the information received includes age= adult and gender=male. The preference nodes of the belief network will have two sets of probabilities; one for each state of the hidden variable. Assume the first set of probabilities when the hidden variable=t is as follows:

| Seinfeld | Matlock | Three Stooges | Sisters | Power Rangers |
|---|---|---|---|---|
| .30 | .27 | .40 | .33 | .34 |

Also assume the second set of probabilities when the hidden variable=F is:

| Seinfeld | Matlock | Three Stooges | Sisters | Power Rangers |
|----------|---------|---------------|---------|---------------|
| .34 | .33 | .35 | .40 | .42 |

Further assume that the θ for the hidden variable equaling state t is 0.3 and the θ for the hidden variable equaling state F is 0.7. As such, the probability for each preference node is calculated by multiplying the probability of the preference node when the hidden variable=t with the θ for the hidden variable equaling true. This value is then added to the probability of the preference node when the hidden variable=f multiplied by the θ for the hidden variable equaling false. Therefore, the probabilities for each preference node given Age=adult, Gender=male and both states of the hidden variable are:

| Seinfeld | Matlock | Three Stooges | Sisters | Power Rangers |
|----------|---------|---------------|---------|---------------|
| .328 | .312 | .358 | .379 | .396 |

Based on these calculations, the ranked listing is as follows: Power Rangers, Sisters, Three Stooges, Seinfeld and Matlock.

AN ALTERNATIVE EMBODIMENT

Figure 13:
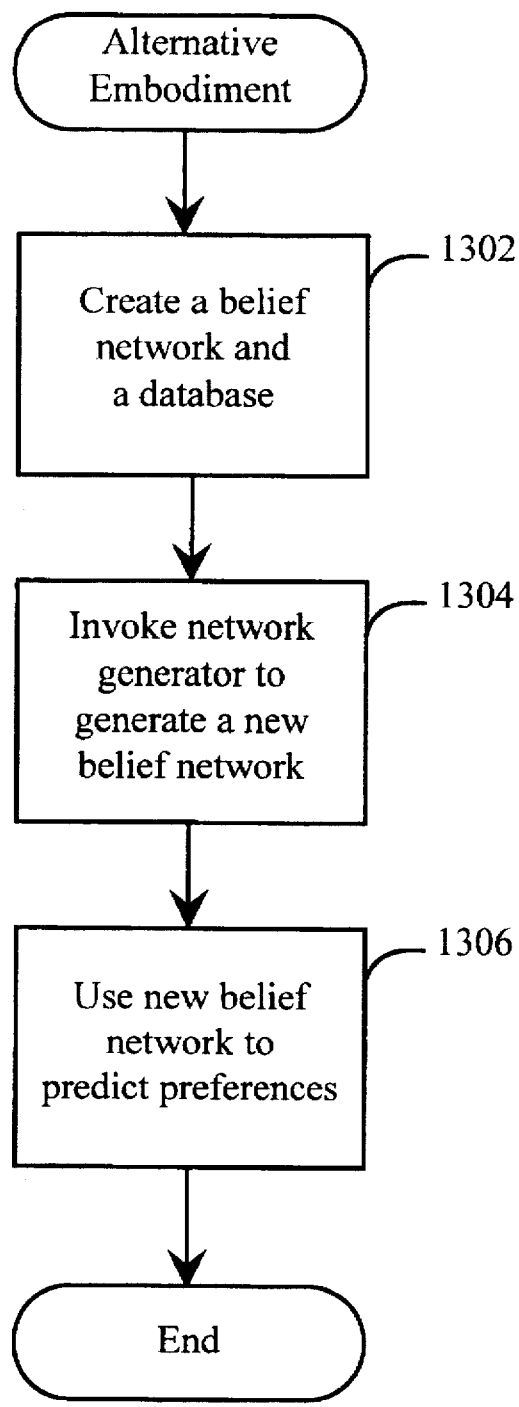
FIG. 13 depicts a flowchart of the steps performed by an alternative embodiment of the present invention.

FIG. 13 depicts a flowchart of the steps performed by an alternative embodiment of the present invention. The alternative embodiment of the present invention utilizes the disclosed system to generate clusters in a similar manner to the well-known AutoClass clustering algorithm, which is described in P. Cheeseman and J. Stutz, *Bavesian Classification AutoClass: Theory and Results*, Advances in Knowledge Discovery and Data Mining, AAAI Press (1995). In order to use the disclosed system in such a manner, iteration is not performed and causal attributes are not used in the initial belief network. The first step performed by the alternative embodiment is to create an initial belief network with caused attributes, no causal variables and only one hidden causal attribute, and to create a database (step 1302). An example of this kind of belief network can be found in FIG. 8. Since there are no causal attributes in the belief network, the cases in the database will have values for user preferences and possibly some caused attributes that are not preferences. A "caused attribute" of a user is an attribute that is influenced by a causal attribute and for which an observation can be made. There are two types of caused attributes: preference and non-preference caused attributes. A caused attribute that is not a preference can be used to infer a preference. For example, if the database 316 of FIG. 5 were used with the alternative embodiment, the fields for age and gender would be absent, but the database may contain a caused attribute that is not a preference, such as whether the user drinks beer. The caused attribute in this situation is not a preference, but it may influence the preferences. This caused attribute is not a preference since it is not a television show that a user can watch. This caused attribute can influence a preference, for example, because it may be determined that beer drinkers tend to watch Seinfeld more than Power Rangers. After creating the belief network, the alternative embodiment invokes the network generator to generate a new belief network (step 1304). The alternative embodiment then passes the new belief network to the collaborative filtering system 314 for use in predicting preferences of a user (step 1306). In this step, since the belief network has no causal attributes, the prediction for the user's preferences is based upon the user's other preferences and non-preference caused attributes. For example, the prediction of whether a user likes the "Three Stooges" would be based on whether they are known to like "Sisters," "Matlock," "Seinfeld" and "Power Rangers."

APPLICATIONS OF THE PREFERRED COLLABORATIVE FILTERING SYSTEM

The preferred collaborative filtering system is not limited in its applicability. Instead, the preferred collaborative filtering system has many applications of which only a few are described below. In order to use the preferred collaborative filtering system to predict preferences of a user, the administrator gathers data, learns a belief network, and then utilizes the belief network in the preferred collaborative filtering system to determine the preferences of the user. Following is a description of how these steps can be utilized for a number of applications. These applications are divided into four classes.

The first class of applications predict what items a user likes or dislikes based on their preferences for other items either within the same category of items or within another category of items. One application within the first class of applications is to predict songs that a user would most likely enjoy. This functionality can occur, for example, in a system that broadcasts music to homes. In utilizing this system, the user can choose to purchase a song, request a song, request the replay of a song, allow the current song to play, or skip the current song. Each time a user performs one of these actions, the action is stored as an observation by the system in a central database. The database contains observations from many users. After creating a database with a significant number of observations, the administrator of the system will learn a belief network, as described above, and then perform probabilistic inferences utilizing the belief network in the preferred collaborative filtering system. The probabilistic inferences performed can be used to continuously play songs for a user that they will most likely enjoy. This application of the preferred collaborative filtering system can also be used with music videos.

The preferred collaborative filtering system can be used to help a user select music (e.g., CDs and tapes) that the system predicts the user will enjoy. Such a system may be used in a music store to assist users in selecting music that they most likely would enjoy based upon attributes that they enter into the system. This system may also be used by a mail order company to send music to a potential customer's home. The database to be used in the system can be easily obtained from the purchase records of the music store. After a database is obtained, a belief network can be learned and then used by the preferred collaborative filtering system.

Another application in the first class of applications is to select television shows for a user. In this application, data can be gathered by observing the shows that users watch, the length of time that they watch a given show, and the shows that are not watched. After collecting this data from a number of users, a database can be created, a belief network can be learned and the preferred collaborative filtering system can be used in order to automatically select TV shows for a particular user that they will most likely enjoy based on attributes of the user.

The preferred collaborative filtering system can be used to personalize an electronic newspaper. This application operates in a system where a newspaper in electronic form is sent to a person's home across a network, such as the Internet. The newspaper received by each user is custom tailored to the preferences of that user. That is, some types of articles may be absent from the personalized edition of the newspaper, and other articles may be shortened or lengthened based upon the preferences of the user. In addition, articles of particular interest may be annotated (e.g., highlighted). The data for this system can be gathered by observing the amount of time that a user spends reading an article on a particular subject, or whether they ignore a particular article. Based upon data observed from many users, a database can be created, a belief network can be learned and the preferred collaborative filtering system can use the belief network to personalize an electronic newspaper for a particular user given known attributes of that user.

The preferred collaborative filtering system can be applied to the Internet. As is well-known, the Internet comprises numerous pages of information that are each typically devoted to a particular subject. This application can be used to direct a user to specific pages in the Internet that the system predicts they will like. The data for the system can be gathered from observing many users' behavior regarding how long they look at a particular page, whether or not they make a copy of the page, or whether or not they create a link to the page. After gathering the data, a database can be created, a belief network can be learned, and the preferred collaborative filtering system can be used to predict the pages of interest to a particular user based on their known attributes. This application can also be used in a similar manner for Encarta articles. Encarta is an electronic encyclopedia available from Microsoft Corporation containing articles on numerous topics. The data can be gathered by observing the articles that users read, the articles that users print out and the articles that are ignored. From the data, a database can be generated, a belief network can be learned and the preferred collaborative filtering system can then be used to present a user with articles in which they will most likely be interested.

The preferences of the user for graphical layouts can be predicted by the preferred collaborative filtering system. Presentation programs, such as the PowerPoint program available from Microsoft Corporation, typically have various customizations including border styles, fonts, etc. that can be used. In this application, data is gathered about the preferences of a number of users regarding the styles of graphical layouts and presentations. These preferences can then be used to recommend styles or templates for a presentation program by creating a database, learning a belief network and utilizing the belief network in the preferred collaborative filtering system.

The preferred collaborative filtering system can be used to indicate the email aliases that a person is predicted to like. In using an email system, users communicate by specifying an alias that indicates either a particular user or a group of users. In this application, a database can be generated from observing the email aliases that many users utilize, a belief network can be learned, and the preferred collaborative filtering system can be used to predict the aliases with which a user would like to communicate based on their known attributes.

Based upon the numerous applications already described, it is apparent to one skilled in the art that the preferred collaborative filtering system can be used to select the preferences of a user in many other areas such as movies, wines, restaurants and real estate. In these systems, the data can be readily gathered from observing the preferences of a number of users, learning a belief network and utilizing the belief network in the preferred collaborative filtering system to predict the preferences of a user based on known attributes of the user.

Any of a number of well-known filtering techniques can be used with the applications of the first class. For example, filtering can be used in the television show application so that only television shows airing on a particular date and time are considered when rendering a prediction. One skilled in the art will recognize that some form of filtering can be applied to all applications of the preferred collaborative filtering system as herein discussed.

The second class of applications to which the preferred collaborative filtering system can be applied involves marketing. In this class of applications, predictions are made for what products a user is likely to purchase or what commercials are likely to be most effective for a given user based on the user's preferences, previous purchase behavior, and demographic information. This type of system can control advertising on various on-line systems, such as the Microsoft network, control commercials on interactive TV, and direct how to market a company's products. In a system targeted to customize advertising on an on-line system, data can be gathered from the on-line articles that a user is interested in, as well as how long they spend reading each article. After gathering the data, a database can be generated, a belief network learned and the belief network can be used in the preferred collaborative filtering system to predict advertisements in which a user would be interested. With respect to the interactive TV application, data can be gathered by observing the likes and dislikes for various commercials by many users. A database can be generated using this data, a belief network can be learned and the belief network can be utilized to select commercials in which a particular user is interested. To help market a company's products, data can be gathered from prior purchases by all customers and the products of interest to a particular customer can be predicted based on their known attributes or preferences.

A third class of applications involves predicting what is inappropriate material for viewing by a child on a form of media, such as television. In this class of applications, data can be gathered by observing parent's reactions to numerous television shows and their indication of the appropriateness for children of various ages. Based on this information, a database can be created, a belief network can be learned and the preferred collaborative filtering system can be used to predict the appropriateness of a particular show for a child given known attributes of the parent and the child. This class of applications can also be applied to music albums, music videos, movies and Internet pages.

A fourth class of applications involves user interfaces. The user interfaces of various software products can be custom tailored to the preferences of a user. These customizations include menu selections, screen layout and window sizing. In this application, the customizations for a user are predicted on known attributes of the user. The data is gathered based on the operations that numerous users invoke on a software product. Based on the data, certain classes of users having similar attributes can be defined and a user interface for each user can be developed. After developing the user interfaces, a belief network can be learned and used in the preferred collaborative filtering system to predict and display a user interface that is customized to a particular class of users based upon known attributes of that user. Using this system, when a user performs operations on the computer, their class can be inferred from the operations that they perform, and when the class is determined, the user interface for that class is automatically displayed.

One skilled in the art will appreciate that the above-described applications can be practiced either individually or in any combination by the preferred embodiment.

While the present invention has been described with reference to a preferred embodiment thereof, those skilled in the art will know of various changes in form that may be made without departing from the spirit and scope of the claimed invention as defined in the appended claims.

What is claimed is:

1. A method in a computer system having a collaborative filtering system for predicting a desired preference of a user based on attributes of the user, comprising the steps of:

receiving into the collaborative filtering system a belief network containing attribute nodes and preference nodes, the attribute nodes reflecting the attributes of the user and having a value, the preference nodes reflecting available preferences of the user, each preference node having a probability indicating the likelihood that the available preference is the desired preference of the user given the values of the attribute nodes;

receiving into the collaborative filtering system a request to determine an available preference having a greatest likelihood of being the desired preference, the request containing values for the attribute nodes;

determining by the collaborative filtering system the available preference having the greatest likelihood of being the desired preference by evaluating the probabilities of the preference nodes given the values of the attribute nodes; and indicating by the collaborative filtering system the available preference having the greatest likelihood of being the desired preference to the user.

2. The method of claim 1, including the steps of, for each available preference, calculating by the collaborative filtering system a likelihood that the available preference is the desired preference given the values of the attribute nodes and indicating by the collaborative filtering system the calculated likelihood to the user.

3. A method in a computer system having a collaborative filtering system for predicting a desired preference of a user based on an attribute of the user, comprising the computer-implemented steps of:

creating a belief network containing an attribute node and preference nodes, the attribute node reflecting an attribute of the user and having a value, the preference nodes reflecting available preferences of the user, each preference node having a probability indicating a likelihood that the available preference is the desired preference of the user given the value of the attribute node;

providing the created belief network to the collaborative filtering system;

receiving a request by the collaborative filtering system to determine an available preference having a greatest likelihood of being the desired preference, the request containing a value for the attribute node;

determining the available preference having the greatest likelihood of being the desired preference by evaluating the probabilities of the preference nodes given the value of the attribute node; and indicating the available preference having the greatest likelihood of being the desired preference to the user.

4. The method of claim 3 wherein the step of creating a belief network includes the steps of:

receiving expert data comprising an initial belief network containing a hidden attribute node and at least one preference node, the hidden attribute node being an unknown factor that causally influences the available preferences;

receiving data comprising sets of values for the preference nodes;

determining groups of sets having similar values, wherein each group has a plurality of sets of values;

receiving an indication of a causal factor in the determined groups to account for the similarity of the values in the sets of values in the groups;

receiving observations for the identified causal factor and adding the observations to the data; and adding the causal factor to the initial belief network as an attribute node after receiving the observations, and wherein the step of providing the created belief network includes providing the initial belief network to the collaborative filtering system.

5. The method of claim 4 wherein the steps of determining groups, receiving an indication, receiving observations and adding the causal factor are repeatedly performed until either a causal factor cannot be identified or observations for the causal factor cannot be gathered.

6. A method in a collaborative filtering system for predicting a desired preference of a user, comprising the computer-implemented steps of:

receiving a belief network into the collaborative filtering system, the belief network containing a hidden attribute node and preference nodes, the hidden attribute node reflecting an unobserved attribute of the user that causally influences the desired preference, the preference nodes reflecting available preferences of the user, each preference node having a value and having a probability indicating a likelihood that the available preference is the desired preference of the user given the values of the preference nodes;

receiving data containing values for the preference nodes;

receiving a plurality of a number of states for the hidden attribute node;

for each number of states for the hidden attribute node,
generating a belief network having the preference nodes and the hidden attribute node, wherein the hidden attribute node has the number of states; and
scoring the generated belief network for goodness in predicting the desired preference based on the data;

selecting a generated belief network having a best goodness in predicting the desired preference based on the data;

receiving a request to determine an available preference having a greatest likelihood of being the desired preference, the request containing a value for at least one of the preference nodes;

determining an available preference having the greatest likelihood of being the desired preference by evaluating the probabilities of the preference nodes in the selected belief network given the value for the at least one preference node; and indicating the available preference having the greatest likelihood of being the desired preference to the user.

7. A method in a computer system for generating a belief network containing caused variables and unbidden causal variables, the computer system having a decision support system, the belief network for providing decision support in a given field of expertise, the caused variables reflecting a decision to be rendered by the decision support system and the causal variables reflecting factors that causally effect the decision, comprising the computer-implemented steps of:

receiving expert data from an expert in the given field comprising a belief network containing a hidden causal variable and caused variables and wherein the expert data includes a plurality of a number of states for the hidden causal variable, the hidden causal variable being an unknown factor that causally influences the caused variables;

receiving data comprising sets of values for the caused variables after receiving the expert data;

determining groups of sets in the received data having similar values;

receiving an indication of a causal factor in the determined groups to account for the similarity of the values in each group;

receiving observations for the identified causal factor and adding the observations to the data;

adding the causal factor to the belief network as an unhidden causal variable after receiving the observations;

receiving a new plurality of a number of states for the hidden causal variable after adding the causal factor; and repeatedly performing the steps of determining groups, receiving an indication, receiving observations, adding the causal factor and receiving a new plurality of a number of states until either a causal factor cannot be identified to account for the similarity of the values in each group or observations for the causal factor cannot be obtained.

8. A collaborative filtering system for predicting a desired preference of a user based on attributes of the user, comprising:

a belief network containing attribute nodes and preference nodes, the attribute nodes reflecting the attributes of the user and having a value, the preference nodes reflecting available preferences of the user, each preference node having a probability indicating a likelihood that the available preference is the desired preference of the user given the values of the attribute nodes;

a receive component for receiving a request to determine an available preference having a greatest likelihood of being the desired preference, the request containing values for the attribute nodes;

a determination component for determining the available preference having the greatest likelihood of being the desired preference by evaluating the probabilities of the preference nodes given the values of the attribute nodes; and an output component for indicating the available preference having the greatest likelihood of being the desired preference.

9. The collaborative filtering system of claim 8 wherein the attribute nodes of the belief network contain discrete values and the preference nodes contain discrete values.

10. The collaborative filtering system of claim 8 wherein at least one of the attribute nodes contains a non-numerical value.

11. The collaborative filtering system of claim 8 wherein at least one of the preference nodes contains a non-numerical value.

12. The collaborative filtering system of claim 8 wherein one of the attribute nodes contains a known preference of the user.

13. A computer-readable memory device containing:

a data structure representing a belief network that comprises nodes, the belief network for use in a collaborative filtering system for predicting a desired preference of a user based on attributes of the user, the nodes further comprising:

attribute nodes reflecting the attributes of the user, wherein each attribute node has a value; and preference nodes reflecting available preferences of the user, each preference node having a probability indicating a likelihood that the available preference is the desired preference of the user given the values of the attribute nodes, wherein the collaborative filtering system receives a request for determining a desired preference of a user among the available preferences, wherein the request contains values for the attribute nodes and in response to receiving the request, the collaborative filtering system evaluates the probabilities of the preference nodes to determine the available preference that is most likely to be the desired preference given the values for the attribute nodes in the request.

14. A computer-readable media that causes a collaborative filtering system in a computer system to predict a desired preference of a user based on attributes of the user, by performing the steps of:

receiving a belief network into the collaborative filtering system, the belief network containing attribute nodes and preference nodes, the attribute nodes reflecting the attributes of the user and having a value, the preference nodes reflecting available preferences of the user, each preference node having a probability indicating the likelihood that the available preference is the desired preference of the user given the values of the attribute nodes;

receiving a request to determine an available preference having a greatest likelihood of being the desired preference, the request containing values for the attribute nodes;

determining the available preference having the greatest likelihood of being the desired preference by evaluating the probabilities of the preference nodes given the values of the attribute nodes; and indicating the available preference having the greatest likelihood of being the desired preference to the user.

15. A computer-readable media that causes a collaborative filtering system in a computer system to predict a desired preference of a user based on an attribute of the user, by performing the steps of:

creating a belief network containing an attribute node and preference nodes, the attribute node reflecting an attribute of the user and having a value, the preference nodes reflecting available preferences of the user, each preference node having a probability indicating a likelihood that the available preference is the desired preference of the user given the value of the attribute node;

providing the created belief network to the collaborative filtering system;

receiving a request by the collaborative filtering system to determine an available preference having a greatest likelihood of being the desired preference, the request containing a value for the attribute node;

determining the available preference having the greatest likelihood of being the desired preference by evaluating the probabilities of the preference nodes given the value of the attribute node; and indicating the available preference having the greatest likelihood of being the desired preference to the user.

16. A computer-readable media that causes a collaborative filtering system in a computer system to predict a desired preference of a user, by performing the steps of:

receiving a belief network into the collaborative filtering system, the belief network containing a hidden attribute node and preference nodes, the hidden attribute node reflecting an unobserved attribute of the user that causally influence the desired preference, the preference nodes reflecting available preferences of the user, each preference node having a value and having a probability indicating a likelihood that the available preference is the desired preference of the user given the values of the preference nodes;

receiving data containing values for the preference nodes;

receiving a range of a number of states for the hidden attribute node;

for each number of states for the hidden attribute node,
generating a belief network having the preference nodes and the hidden attribute node, wherein the hidden attribute node has the number of states; and
scoring the generated belief network for goodness in predicting the desired preference based on the data;

selecting a generated belief network having a best goodness in predicting the desired preference based on the data;

receiving a request to determine an available preference having a greatest likelihood of being the desired preference, the request containing a value for at least one of the preference nodes;

determining an available preference having the greatest likelihood of being the desired preference by accessing the generated belief network having the best goodness and evaluating the probabilities of the preference nodes given the value for the at least one preference node; and indicating the available preference having the greatest likelihood of being the desired preference to the user.

17. A computer-readable media that causes a computer system to generate a belief network containing caused variables and unbidden causal variables, the computer system having a decision support system, the belief network for providing decision support in a given field of expertise, the caused variables reflecting a decision to be rendered by the decision support system and the causal variables reflecting factors that causally effect the decision, by performing the steps of:

receiving expert data from an expert in the given field comprising a belief network containing a hidden causal variable and caused variables and wherein the expert data includes a plurality of a number of states for the hidden causal variable, the hidden causal variable being an unknown factor that causally influences the caused variables;

receiving data comprising sets of values for the caused variables after receiving the expert data;

determining groups of sets in the received data having similar values;

receiving an indication of a causal factor in the determined groups to account for the similarity of the values in each group;

receiving observations for the identified causal factor and adding the observations to the data after identifying a causal factor;

adding the causal factor to the belief network as an unhidden causal variable after receiving the observations;

receiving a new plurality of a number of states for the hidden causal variable after adding the causal factor; and repeatedly performing the steps of determining groups, receiving an indication, receiving observations, adding the causal factor and receiving a new range of a number of states until either a causal factor cannot be identified to account for the similarity of the values in each group or observations for the causal factor cannot be obtained.

18. A method in a collaborative filtering system for predicting a desired preference of a user based on a characteristic of the user, comprising the computer-implemented steps of:

receiving a belief network into the collaborative filtering system, the belief network containing preference nodes reflecting available preferences of the user, each preference node having a probability indicating the likelihood that the available preference is the desired preference of the user given a value for the characteristic of the user;

receiving a request to determine an available preference having a greatest likelihood of being the desired preference, the request containing a value for the characteristic of the user;

determining the available preference having the greatest likelihood of being the desired preference by evaluating the probabilities of the preference nodes given the value of the characteristics; and indicating the available preference having the greatest likelihood of being the desired preference to the user.

19. The method of claim 18 wherein the collaborative filtering system predicts a desired song of a user, wherein the preference nodes of the belief network contain available songs, and wherein the step of indicating the available preference includes indicating the available song.

20. The method of claim 18 wherein the collaborative filtering system predicts a desired music video of a user, wherein the preference nodes of the belief network contain available music videos, and wherein the step of indicating the available preference includes indicating the available music video having the greatest likelihood of being the desired music video.

21. The method of claim 18 wherein the collaborative filtering system predicts desired music to be purchased by a user, wherein the preference nodes of the belief network contain available music, and wherein the step of indicating the available preference includes indicating the available music having the greatest likelihood of being the desired music.

22. The method of claim 18 wherein the collaborative filtering system predicts a desired television show of a user, wherein the preference nodes of the belief network contain available television shows, and wherein the step of indicating the available preference includes indicating the available television show having the greatest likelihood of being the desired television show.

23. The method of claim 18 wherein the collaborative filtering system is used to incorporate a desired customization of a user into an electronic newspaper, wherein the preference nodes of the belief network contain available customizations for the electronic newspaper, and wherein the step of indicating the available preference includes indicating the available customization having the greatest likelihood of being the desired customization.

24. The method of claim 18 wherein the collaborative filtering system predicts a desired Internet page of a user, wherein the preference nodes of the belief network contain available Internet pages, and wherein the step of indicating the available preference includes indicating the available Internet page having the greatest likelihood of being the desired Internet page.

25. The method of claim 18 wherein the collaborative filtering system predicts a desired Encarta article of a user, wherein the preference nodes of the belief network contain available Encarta articles, and wherein the step of indicating the available preference includes indicating the available Encarta article having the greatest likelihood of being the desired Encarta article.

26. The method of claim 18 wherein the collaborative filtering system predicts a desired graphical layout of a user for a graphical presentation program, wherein the preference nodes of the belief network contain available graphical layouts, and wherein the step of indicating the available preference includes indicating the available graphical layout having the greatest likelihood of being the desired graphical layout.

27. The method of claim 18 wherein the collaborative filtering system predicts a desired email alias of a user, wherein the preference nodes of the belief network contain available email aliases, and wherein the step of indicating the available preference includes indicating the available email alias having the greatest likelihood of being the desired email alias.

28. The method of claim 18 wherein the request includes a selection criteria, wherein the step of determining the available preference includes determining the available preference that has the greatest likelihood of being the desired preference and that conforms to the selection criteria, and wherein the step of indicating the available preference includes indicating the available preference that has the greatest likelihood of being the desired preference and that conforms to the selection criteria.

29. The method of claim 18 wherein the collaborative filtering system predicts a desired movie of a user, wherein the preference nodes of the belief network contain available movies, and wherein the step of indicating the available preference includes indicating the available movie having the greatest likelihood of being the desired movie.

30. The method of claim 18 wherein the collaborative filtering system predicts a desired wine of a user, wherein the preference nodes of the belief network contain available wines, and wherein the step of indicating the available preference includes indicating the available wine having the greatest likelihood of being the desired wine.

31. The method of claim 18 wherein the collaborative filtering system predicts a desired restaurant of a user, wherein the preference nodes of the belief network contain available restaurants, and wherein the step of indicating the available preference includes indicating the available restaurant having the greatest likelihood of being the desired restaurant.

32. The method of claim 18 wherein the collaborative filtering system predicts desired real estate of a user, wherein the preference nodes of the belief network contain available real estate, and wherein the step of indicating the available preference includes indicating the available real estate having the greatest likelihood of being the desired real estate.

33. The method of claim 18 wherein the collaborative filtering system predicts a desired advertisement of a user, wherein the preference nodes of the belief network contain available advertisements, and wherein the step of indicating the available preference includes indicating the available advertisement having the greatest likelihood of being the desired advertisement.

34. The method of claim 33 wherein the step of indicating the available advertisement includes viewing the available advertisement having the greatest likelihood of being the desired advertisement by the user via an on-line system.

35. The method of claim 33 wherein the step of indicating the available advertisement includes viewing the available advertisement having the greatest likelihood of being the desired advertisement by the user via an interactive television.

36. The method of claim 33 wherein the step of indicating the available advertisement includes viewing the available advertisement having the greatest likelihood of being the desired advertisement by a user via a computer network.

37. The method of claim 18 wherein the collaborative filtering system predicts desired products of a user, wherein the preference nodes of the belief network contain available products, and wherein the step of indicating the available preference includes indicating the available product having the greatest likelihood of being the desired product.

38. The method of claim 18 wherein the collaborative filtering system predicts inappropriate material that is deemed unsuitable for viewing by children, wherein the preference nodes of the belief network contain available material, and wherein the step of indicating the available preference includes indicating the available material having the greatest likelihood of being the inappropriate material.

39. The method of claim 38 wherein the available material includes music.

40. The method of claim 38 wherein the available material includes music videos.

41. The method of claim 38 wherein the available material includes movies.

42. The method of claim 38 wherein the available material includes Internet pages.

43. The method of claim 18 wherein the collaborative filtering system predicts a desired user interface of a user, wherein the preference nodes of the belief network contain available user interfaces, and wherein the step of indicating the available preference includes indicating the available user interface having the greatest likelihood of being the desired user interface.

* * * * *